(12) United States Patent
Katayama et al.

(10) Patent No.: US 11,822,348 B2
(45) Date of Patent: Nov. 21, 2023

(54) FLIGHT VEHICLE AND METHOD OF CONTROLLING FLIGHT VEHICLE

(71) Applicant: KAWASAKI JUKOGYO KABUSHIKI KAISHA, Kobe (JP)

(72) Inventors: Noriaki Katayama, Aichi (JP); Yuichi Kumamoto, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 602 days.

(21) Appl. No.: 17/096,981

(22) Filed: Nov. 13, 2020

(65) Prior Publication Data

US 2021/0064062 A1 Mar. 4, 2021

Related U.S. Application Data

(63) Continuation of application No. PCT/JP2019/018972, filed on May 13, 2019.

(30) Foreign Application Priority Data

May 14, 2018 (JP) ................................. 2018-093169

(51) Int. Cl.
*G05D 1/10* (2006.01)
*B64C 29/00* (2006.01)
(Continued)

(52) U.S. Cl.
CPC .......... *G05D 1/102* (2013.01); *B64C 29/0033* (2013.01); *G05D 1/0858* (2013.01); *B64C 27/52* (2013.01)

(58) Field of Classification Search
CPC .. G05D 1/102; G05D 1/0858; B64C 29/0033; B64C 27/52; B64C 27/43
(Continued)

(56) References Cited

U.S. PATENT DOCUMENTS 4,092,084 A * 5/1978 Barltrop .................. B64C 27/43
416/102
9,764,829 B1 * 9/2017 Beckman ................ B64C 27/08
(Continued)

FOREIGN PATENT DOCUMENTS

CN 110015415 A * 7/2019
CN 210555569 U * 5/2020
(Continued)

*Primary Examiner* — Christopher P Ellis
(74) *Attorney, Agent, or Firm* — XSENSUS LLP

(57) ABSTRACT

A flight vehicle includes a main body, a thrust generating unit, and one or more joints. The thrust generating unit includes one or more thrust generating subunits. Each joint is respectively associated with a corresponding thrust generating subunit. Each joint couples a corresponding thrust generating subunit to the main body and permits the associated thrust generating subunit to freely pivot relative to the main body. Each thrust generating subunit includes a plurality of thrust generators. Within each thrust generating subunit, one or more of the thrust generators is arranged to generate thrust that induces a first torque in one direction along a circumference of a circle centered on a first pivot axis, and other one or more of the thrust generators is arranged to generate thrust that induces a second torque in an opposite direction along the circumference of the circle centered on the first pivot axis.

20 Claims, 15 Drawing Sheets

(51) Int. Cl.
  *G05D 1/08* (2006.01)
  *B64C 27/52* (2006.01)
(58) Field of Classification Search
  USPC .......................................................... 244/12.4
  See application file for complete search history.

(56) References Cited

U.S. PATENT DOCUMENTS

| | | | |
|---|---|---|---|
| 11,106,221 B1* | 8/2021 | Thrun | B64C 27/41 |
| 2002/0104922 A1* | 8/2002 | Nakamura | B64C 27/08 |
| | | | 244/17.25 |
| 2007/0181742 A1* | 8/2007 | Van de Rostyne | A63H 27/12 |
| | | | 244/17.23 |
| 2012/0261523 A1* | 10/2012 | Shaw | B64C 29/0033 |
| | | | 244/7 R |
| 2015/0175258 A1* | 6/2015 | Lee | B64C 27/14 |
| | | | 244/17.23 |
| 2015/0274286 A1* | 10/2015 | Kereth | B64C 27/10 |
| | | | 244/17.21 |
| 2016/0010627 A1* | 1/2016 | Austin | F03D 13/20 |
| | | | 290/55 |
| 2016/0107751 A1* | 4/2016 | D'Andrea | B64C 39/024 |
| | | | 701/4 |
| 2016/0167776 A1* | 6/2016 | Shaw | B64C 27/52 |
| | | | 244/6 |
| 2016/0244157 A1 | 8/2016 | Welsh | |
| 2017/0101175 A1 | 4/2017 | Welsh | |
| 2017/0267367 A1 | 9/2017 | Senkel et al. | |
| 2018/0086442 A1* | 3/2018 | Regev | B64C 29/0008 |
| 2021/0024213 A1* | 1/2021 | Regev | B64C 3/38 |

FOREIGN PATENT DOCUMENTS

| | | | | |
|---|---|---|---|---|
| CN | 109279011 B | * | 12/2021 | ............ B64C 27/08 |
| CN | 114044122 A | * | 2/2022 | |
| CN | 114394228 A | * | 4/2022 | |
| FR | 2591188 A1 | * | 10/2020 | |
| GB | 2560181 A | * | 9/2018 | ............ B64C 27/08 |
| JP | 2017-525621 A | | 9/2017 | |
| JP | 2018-508407 A | | 3/2018 | |
| WO | WO-2015061857 A1 | * | 5/2015 | ............ A63H 27/00 |
| WO | WO-2020151361 A1 | * | 7/2020 | ............ B64C 1/069 |
| WO | WO-2020219278 A1 | * | 10/2020 | ............ B64C 11/48 |

* cited by examiner

FLIGHT VEHICLE AND METHOD OF CONTROLLING FLIGHT VEHICLE

CROSS-REFERENCE TO RELATED APPLICATIONS

The present application is a bypass continuation of and claims priority to PCT/JP2019/018972, filed on May 13, 2019, which claims priority to JP 2018-093169, filed May 14, 2018, both of which are incorporated by reference in their entirety.

TECHNICAL FIELD

The present application relates to a flight vehicle and a method of controlling the flight vehicle.

BACKGROUND

Conventionally, an aircraft including a plurality of rotors is configured to, during flight, adjust the rotational speed of each rotor to assume a desired flight attitude and generate thrust acting in a direction appropriate for the flight attitude.

If the size of the body of the aircraft is increased, the kinematic performance of the aircraft may be reduced because of increases in the moments of inertia of the body and the thrust generating device. Additionally, when the attitude of the aircraft is disturbed by a disturbing factor such as a gust during hovering, the aircraft is difficult to quickly return to the original location and attitude, and the flight stability may be reduced.

SUMMARY

To solve the above problems, a flight vehicle according to an aspect of the present application includes a main body, a thrust generating unit, and one or more joints. The thrust generating unit comprises one or more thrust generating subunits. Each joint is respectively associated with a corresponding thrust generating subunit of the one or more thrust generating subunits. Each joint couples the corresponding thrust generating subunit to the main body and permits the corresponding thrust generating subunit to freely pivot relative to the main body along a circumference of a circle centered on a first pivot axis intersecting a direction of thrust generated by the corresponding thrust generating subunit. Each thrust generating subunit comprises a plurality of thrust generators, each thrust generator being configured to change a magnitude of thrust to be generated independently of the other thrust generators. Within each thrust generating subunit, a first thrust generator group constituted by one or more of the thrust generators is arranged to generate thrust that induces a first torque urging the thrust generating subunit in one direction along the circumference of the circle centered on the first pivot axis, and a second thrust generator group constituted by other one or more of the thrust generators is arranged to generate thrust that induces a second torque urging the thrust generating subunit in an opposite direction along the circumference of the circle centered on the first pivot axis.

DETAILED DESCRIPTION OF THE DRAWINGS

Figure 1:
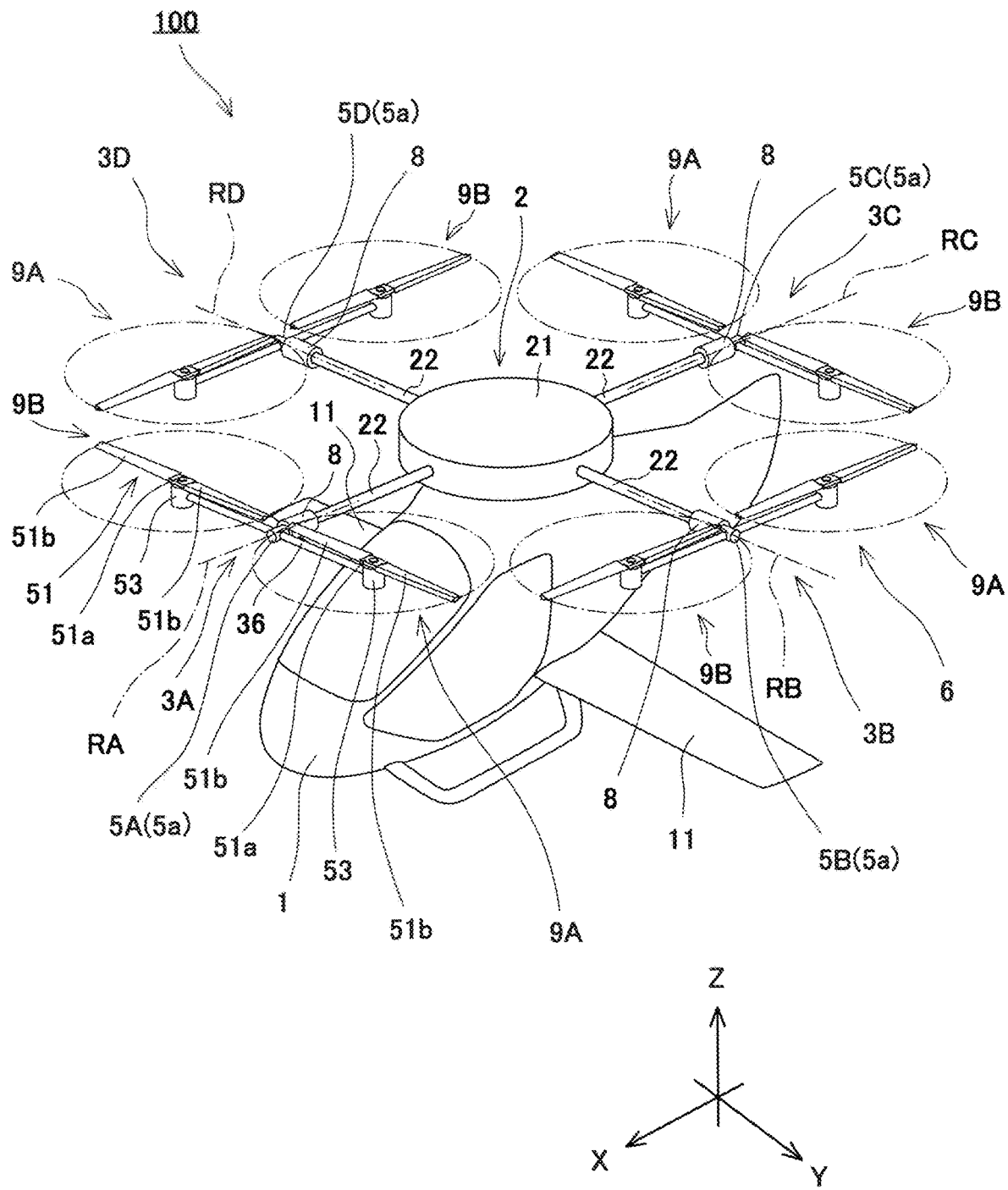
FIG. 1 is a perspective view illustrating an exemplary flight vehicle according to Embodiment 1.

A flight vehicle according to an aspect of the present application includes a main body, a thrust generating unit, and one or more joints. The thrust generating unit comprises one or more thrust generating subunits. Each joint is respectively associated with a corresponding thrust generating subunit of the one or more thrust generating subunits. Each joint couples the corresponding thrust generating subunit to the main body and permits the corresponding thrust generating subunit to freely pivot relative to the main body along a circumference of a circle centered on a first pivot axis intersecting a direction of thrust generated by the corresponding thrust generating subunit. Each thrust generating subunit comprises a plurality of thrust generators, each thrust generator being configured to change a magnitude of thrust to be generated independently of the other thrust generators. Within each thrust generating subunit, a first thrust generator group constituted by one or more of the thrust generators is arranged to generate thrust that induces a first torque urging the thrust generating subunit in one direction along the circumference of the circle centered on the first pivot axis, and a second thrust generator group constituted by other one or more of the thrust generators is arranged to generate thrust that induces a second torque urging the thrust generating subunit in an opposite direction along the circumference of the circle centered on the first pivot axis.

A flight vehicle according to another aspect includes: a main body; a thrust generating unit including one or more thrust generating subunits; and one or more joints associated respectively with the one or more thrust generating subunits, each joint coupling the associated thrust generating subunit to the main body and permitting the associated thrust generating subunit to freely pivot relative to the main body along a circumference of a circle centered on a first pivot axis intersecting a direction of thrust generated by the associated thrust generating subunit, wherein each thrust generating subunit includes a plurality of thrust generators, each thrust generator being configured to change a magnitude of thrust to be generated independently of the other thrust generator or generators, and in each thrust generating subunit, a first thrust generator group constituted by one or more of the thrust generators is arranged to generate thrust that induces a torque urging the thrust generating subunit in one direction along the circumference of the circle centered on the first pivot axis, and a second thrust generator group constituted by other one or more of the thrust generators is arranged to generate thrust that induces a torque urging the thrust generating subunit in the opposite direction along the circumference of the circle centered on the first pivot axis.

In this configuration, the direction of thrust to be generated can be changed while the main body is held in a fixed attitude. Further, this configuration can eliminate the need for, or reduce the size of, an actuator specialized for causing the thrust generating subunit to pivot along the circumference of the circle centered on the first pivot axis in order to change the direction of the thrust generated by the thrust generating subunit. Thus, the construction of the flight vehicle can be simplified, and the weight of the body of the flight vehicle can be reduced. Additionally, the flexibility in arranging the mechanism for thrust generation can be increased, and adaptations to various forms are made possible. Further, manufacturing advantages are obtained, and a low manufacturing cost can be achieved.

The flight vehicle may further include a controller, and/or control circuitry, configured to control operation of each thrust generator, and the controller may adjust the magnitude of the thrust generated by each thrust generator of the first thrust generator group and the magnitude of the thrust generated by each thrust generator of the second thrust generator group to achieve a balance between the torque urging the thrust generating subunit in the one direction along the circumference of the circle centered on the first pivot axis and the torque urging the thrust generating subunit in the opposite direction along the circumference of the circle centered on the first pivot axis.

In this configuration, the joint can be held in a fixed angular position along the circumference of the circle centered on the first pivot axis, and the thrust generated by the thrust generating subunit can be directed in a fixed direction.

The controller may adjust the magnitude of the thrust generated by each thrust generator of the first thrust generator group and the magnitude of the thrust generated by each thrust generator of the second thrust generator group to break the balance between the torque urging the thrust generating subunit in the one direction along the circumference of the circle centered on the first pivot axis and the torque urging the thrust generating subunit in the opposite direction along the circumference of the circle centered on the first pivot axis.

In this configuration, the direction of thrust of each thrust generating subunit about the first pivot axis can be appropriately adjusted.

The flight vehicle may further include: a controller configured to control operation of each thrust generator; and an inclination angle detector configured to detect information for detecting an angular position of the joint along the circumference of the circle centered on the first pivot axis. If there is no deviation between an input target angular position of the joint along the circumference of the circle centered on the first pivot axis and the angular position of the joint as detected by the inclination angle detector along the circumference of the circle centered on the first pivot axis, the controller may adjust the magnitude of the thrust generated by each thrust generator of the first thrust generator group and the magnitude of the thrust generated by each thrust generator of the second thrust generator group to achieve a balance between the torque urging the thrust generating subunit in the one direction along the circumference of the circle centered on the first pivot axis and the torque urging the thrust generating subunit in the opposite direction along the circumference of the circle centered on the first pivot axis, and if there is a deviation between the input target angular position of the joint along the circumference of the circle centered on the first pivot axis and the angular position of the joint as detected by the inclination angle detector along the circumference of the circle centered on the first pivot axis, the controller may adjust the magnitude of the thrust generated by each thrust generator of the first thrust generator group and the magnitude of the thrust generated by each thrust generator of the second thrust generator group to break the balance between the torque urging the thrust generating subunit in the one direction along the circumference of the circle centered on the first pivot axis and the torque urging the thrust generating subunit in the opposite direction along the circumference of the circle centered on the first pivot axis and reduce the deviation.

In this configuration, the direction of thrust of each thrust generating subunit about the first pivot axis can be controlled.

The thrust generating subunits of the thrust generating unit may include first, second, third, and fourth thrust generating subunits, the first, second, third, and fourth thrust generating subunits may be arranged in this order at regular intervals along a circumference of a circle centered on a yaw axis of the flight vehicle, the first pivot axes of the joints associated with the first and third thrust generating subunits may extend in a forward/rearward direction, and the first pivot axes of the joints associated with the second and fourth thrust generating subunits may extend in a leftward/rightward direction.

In this configuration, movements in the forward/rearward direction and the leftward/rightward direction can be appropriately accomplished.

Each joint coupling the associated thrust generating subunit to the main body may further permit the associated thrust generating subunit to freely pivot relative to the main body along a circumference of a circle centered on a second pivot axis intersecting the direction of the thrust generated by the associated thrust generating subunit and intersecting the first pivot axis, the thrust generators of each thrust generating subunit may include three or more thrust generators, and in each thrust generating subunit, a third thrust generator group constituted by one or more of the three or more thrust generators may be arranged to generate thrust that induces a torque urging the thrust generating subunit in one direction along the circumference of the circle centered on the second pivot axis, and a fourth thrust generator group constituted by other one or more of the three or more thrust generators may be arranged to generate thrust that induces a torque urging the thrust generating subunit in the opposite direction along the circumference of the circle centered on the second pivot axis.

This configuration can eliminate the need for, or reduce the size of, an actuator specialized for causing the thrust generating subunit to pivot along the circumference of the circle centered on the second pivot axis in order to change the direction of the thrust generated by the thrust generating subunit. Thus, the construction of the flight vehicle can be simplified, and the weight of the flight vehicle can be reduced. Additionally, the flexibility in arranging the mechanism for thrust generation can be increased, and adaptations to various forms are made possible. Further, manufacturing advantages are obtained, and a low manufacturing cost can be achieved.

The flight vehicle may further include a controller configured to control operation of each thrust generator, the controller may adjust the magnitude of the thrust generated by each thrust generator of the first thrust generator group and the magnitude of the thrust generated by each thrust generator of the second thrust generator group to achieve a balance between the torque urging the thrust generating subunit in the one direction along the circumference of the circle centered on the first pivot axis and the torque urging the thrust generating subunit in the opposite direction along the circumference of the circle centered on the first pivot axis, and the controller may adjust the magnitude of the thrust generated by each thrust generator of the third thrust generator group and the magnitude of the thrust generated by each thrust generator of the fourth thrust generator group to achieve a balance between the torque urging the thrust generating subunit in the one direction along the circumference of the circle centered on the second pivot axis and the torque urging the thrust generating subunit in the opposite direction along the circumference of the circle centered on the second pivot axis.

In this configuration, the thrust of each thrust generating subunit can be directed in a fixed direction about the second pivot axis as well as about the first pivot axis.

The controller may adjust the magnitude of the thrust generated by each thrust generator of the first thrust generator group and the magnitude of the thrust generated by each thrust generator of the second thrust generator group to break the balance between the torque urging the thrust generating subunit in the one direction along the circumference of the circle centered on the first pivot axis and the torque urging the thrust generating subunit in the opposite direction along the circumference of the circle centered on the first pivot axis, and the controller may adjust the magnitude of the thrust generated by each thrust generator of the third thrust generator group and the magnitude of the thrust generated by each thrust generator of the fourth thrust generator group to break the balance between the torque urging the thrust generating subunit in the one direction along the circumference of the circle centered on the second pivot axis and the torque urging the thrust generating subunit in the opposite direction along the circumference of the circle centered on the second pivot axis.

In this configuration, the direction of the thrust of each thrust generating subunit can be changed about the second pivot axis as well as about the first pivot axis.

The flight vehicle may further include: a controller configured to control operation of each thrust generator; and an inclination angle detector configured to detect information for detecting an angular position of the joint along the circumference of the circle centered on the first pivot axis and an angular position of the joint along the circumference of the circle centered on the second pivot axis. If there is no deviation between an input target angular position of the joint along the circumference of the circle centered on the first pivot axis and the angular position of the joint as detected by the inclination angle detector along the circumference of the circle centered on the first pivot axis, the controller may adjust the magnitude of the thrust generated by each thrust generator of the first thrust generator group and the magnitude of the thrust generated by each thrust generator of the second thrust generator group to achieve a balance between the torque urging the thrust generating subunit in the one direction along the circumference of the circle centered on the first pivot axis and the torque urging the thrust generating subunit in the opposite direction along the circumference of the circle centered on the first pivot axis, and if there is a deviation between the input target angular position of the joint along the circumference of the circle centered on the first pivot axis and the angular position of the joint as detected by the inclination angle detector along the circumference of the circle centered on the first pivot axis, the controller may adjust the magnitude of the thrust generated by each thrust generator of the first thrust generator group and the magnitude of the thrust generated by each thrust generator of the second thrust generator group to break the balance between the torque urging the thrust generating subunit in the one direction along the circumference of the circle centered on the first pivot axis and the torque urging the thrust generating subunit in the opposite direction along the circumference of the circle centered on the first pivot axis and reduce the deviation. If there is no deviation between an input target angular position of the joint along the circumference of the circle centered on the second pivot axis and the angular position of the joint as detected by the inclination angle detector along the circumference of the circle centered on the second pivot axis, the controller may adjust the magnitude of the thrust generated by each thrust generator of the third thrust generator group and the magnitude of the thrust generated by each thrust generator of the fourth thrust generator group to achieve a balance between the torque urging the thrust generating subunit in the one direction along the circumference of the circle centered on the second pivot axis and the torque urging the thrust generating subunit in the opposite direction along the circumference of the circle centered on the second pivot axis, and if there is a deviation between the input target angular position of the joint along the circumference of the circle centered on the second pivot axis and the angular position of the joint as detected by the inclination angle detector along the circumference of the circle centered on the second pivot axis, the controller may adjust the magnitude of the thrust generated by each thrust generator of the third thrust generator group and the magnitude of the thrust generated by each thrust generator of the fourth thrust generator group to break the balance between the torque urging the thrust generating subunit in the one direction along the circumference of the circle centered on the second pivot axis and the torque urging the thrust generating subunit in the opposite direction along the circumference of the circle centered on the second pivot axis and reduce the deviation.

In this configuration, the direction of thrust of each thrust generating subunit can be controlled about the second pivot axis as well as about the first pivot axis.

The thrust generating subunits of the thrust generating unit may include first, second, third, and fourth thrust generating subunits, and the first, second, third, and fourth thrust generating subunits may be arranged in this order at regular intervals along a circumference of a circle centered on a yaw axis of the flight vehicle.

In this configuration, each thrust generating subunit can be inclined in a desired direction. The control force acting in a lateral direction can be increased by inclining the thrust generating subunits in the same direction.

A flight vehicle according to another aspect includes a main body, a thrust generating device, and one or more joints. The thrust generating device comprises one or more thrust generating sub-devices, each thrust generating sub-device comprising a plurality of thrust generators arranged in a line and a coupler coupling the plurality of thrust generators together, and each thrust generator being configured to change a magnitude of thrust to be generated independently of other thrust generators in the respective thrust generating sub-device. Each joint is respectively associated with a corresponding thrust generating sub-device of the one or more thrust generating sub-devices, wherein each joint couples the coupler of the corresponding thrust generating sub-device to the main body and permits the coupler to freely pivot relative to the main body along a circumference of a circle centered on a first pivot axis intersecting a direction in which the thrust generators, of the corresponding thrust generating sub-device, are arranged and intersecting a direction of thrust generated by the corresponding thrust generating sub-device.

A flight vehicle according to another aspect includes a main body; a thrust generating unit including one or more thrust generating subunits, each thrust generating subunit including a plurality of thrust generators arranged in a line and a coupler coupling the thrust generators together, each thrust generator being configured to change a magnitude of thrust to be generated independently of the other thrust generator or generators; and one or more joints associated respectively with the one or more thrust generating subunits, each joint coupling the coupler of the associated thrust generating subunit to the main body and permitting the coupler to freely pivot relative to the main body along a circumference of a circle centered on a first pivot axis intersecting a direction in which the thrust generators are arranged and intersecting a direction of thrust generated by the associated thrust generating subunit.

In this configuration, the direction of thrust to be generated can be changed while the main body is held in a fixed attitude. Further, this configuration can eliminate the need for, or reduce the size of, an actuator specialized for causing the thrust generating subunit to pivot along the circumference of the circle centered on the first pivot axis in order to change the direction of the thrust generated by the thrust generating subunit. Thus, the construction of the flight vehicle can be simplified, and the weight of the body of the flight vehicle can be reduced. Additionally, the flexibility in arranging the mechanism for thrust generation can be increased, and adaptations to various forms are made possible. Further, manufacturing advantages are obtained, and a low manufacturing cost can be achieved.

The flight vehicle may further include a pair of left and right fixed wings each having a proximal end secured to the main body, the left fixed wing extending leftward from the main body, the right fixed wing extending rightward from the main body, the left and right fixed wings being configured to generate lift upon forward movement of the main body. The thrust generating subunits of the thrust generating unit may include a left thrust generating subunit coupled to the left fixed wing and a right thrust generating subunit coupled to the right fixed wing, and the first pivot axes of the left and right thrust generating subunits may extend in a leftward/rightward direction.

In this configuration, the constructions of the rotor mechanism and the tilt mechanism can be simplified to reduce the weight of the body of the flight vehicle while both hovering performance and high-speed flight performance are ensured.

The flight vehicle may further include a pair of left and right fixed wings each having a proximal end coupled to the main body, the left fixed wing extending leftward from the main body, the right fixed wing extending rightward from the main body, each of the left and right fixed wings being swingable between a first angular position and a second angular position along a circumference of a circle centered on a fixed wing pivot axis parallel to the first pivot axis, the first angular position being a position where a chord of the fixed wing extends in an upward/downward direction, the second angular position being a position where the chord extends in a horizontal direction, each of the left and right fixed wings being configured to, when placed in the second angular position, generate lift upon forward movement of the main body, and the thrust generating subunits of the thrust generating unit may include a left thrust generating subunit coupled to the left fixed wing and a right thrust generating subunit coupled to the right fixed wing.

In this configuration, the construction of the rotor mechanism can be simplified to reduce the weight of the body of the flight vehicle while both hovering performance and high-speed flight performance are ensured. Additionally, the influence of each fixed wing on the air flow generated by the thrust generators can be reduced, and the efficiency of hovering can be improved.

Each of the fixed wings may be freely swingable between the first angular position and the second angular position, and the flight vehicle may further include: a joint locking mechanism configured to prevent and permit movement of each of the joints associated with the left and right thrust generating subunits along the circumference of the circle centered on the first pivot axis; and a fixed wing locking mechanism configured to prevent and permit swinging movement of each of the fixed wings along the circumference of the circle centered on the fixed wing pivot axis. In each of the left and right thrust generating subunits, a first thrust generator group constituted by one or more of the thrust generators may be arranged to generate thrust that induces a torque urging the thrust generating subunit in one direction along the circumferences of the circles centered on the first pivot axis and the fixed wing pivot axis, and a second thrust generator group constituted by other one or more of the thrust generators may be arranged to generate thrust that induces a torque urging the thrust generating subunit in the opposite direction along the circumferences of the circles centered on the first pivot axis and the fixed wing pivot axis.

In this configuration, the construction of the tilt mechanism can be simplified to reduce the weight of the body of the flight vehicle while both hovering performance and high-speed flight performance are ensured.

The thrust generating unit may include a plurality of the thrust generating subunits, the main body may include a suspension cable and a suspender configured to suspend a cargo via the suspension cable, the suspension cable may hang from the suspender, and each joint may couple the associated thrust generating subunit to the suspender.

In this configuration, the direction of thrust to be generated can be changed while the main body is held in a fixed attitude, and the cargo can be transported while the orientation of the cargo is stabilized. Additionally, reduction in responsivity which may occur when the cargo is a heavy object can be prevented.

The main body may include a plurality of the suspension cables, and the suspension cables may hang from different locations on the suspender.

In this configuration, shaking of the cargo can be effectively reduced during transportation of the cargo.

The flight vehicle may further include a brake configured to prevent and permit movement of the joint.

In this configuration, the thrust of each thrust generating subunit about the first or second pivot axis can be directed in a fixed direction.

The flight vehicle may further include a damper configured to apply a damping force to pivoting movement of the joint.

In this configuration, the behavior of each thrust generating subunit along the circumference of the circle centered on the first or second pivot axis can be stabilized.

A flight vehicle control method according to an aspect of the present application is a method of controlling a flight vehicle that includes a main body, a thrust generating unit including one or more thrust generating subunits, a first detector, and one or more joints, wherein each joint is respectively associated with a corresponding thrust generating subunit of the one or more thrust generating subunits, each joint couples the corresponding thrust generating subunit to the main body and permits the corresponding thrust generating subunit to freely pivot relative to the main body along a circumference of a circle centered on a first pivot axis intersecting a direction of thrust generated by the corresponding thrust generating subunit, the first detector is configured to detect an angular position of a joint along the circumference of the circle centered on the first pivot axis, each thrust generating subunit includes a plurality of thrust generators, each thrust generator being configured to change a magnitude of thrust to be generated independently of the other thrust generators, and in each thrust generating subunit, a first thrust generator group constituted by one or more of the thrust generators is arranged to generate thrust that induces a first torque urging the thrust generating subunit in one direction along the circumference of the circle centered on the first pivot axis, and a second thrust generator group constituted by other one or more of the thrust generators is arranged to generate thrust that induces a second torque urging the thrust generating subunit in an opposite direction along the circumference of the circle centered on the first pivot axis. The method comprises: adjusting, in a case that there is no deviation between an input target angular position of the joint along the circumference of the circle centered on the first pivot axis and the angular position of the joint as detected by the first detector along the circumference of the circle centered on the first pivot axis, the magnitude of the thrust generated by each thrust generator of the first thrust generator group and the magnitude of the thrust generated by each thrust generator of the second thrust generator group to balance the first torque urging the thrust generating subunit in the one direction along the circumference of the circle centered on the first pivot axis and the second torque urging the thrust generating subunit in the opposite direction along the circumference of the circle centered on the first pivot axis; and adjusting, in a case that there is a deviation between the input target angular position of the joint along the circumference of the circle centered on the first pivot axis and the angular position of the joint as detected by the inclination angle detector along the circumference of the circle centered on the first pivot axis, the magnitude of the thrust generated by each thrust generator of the first thrust generator group and the magnitude of the thrust generated by each thrust generator of the second thrust generator group to break the balance between the first torque urging the thrust generating subunit in the one direction along the circumference of the circle centered on the first pivot axis and the second torque urging the thrust generating subunit in the opposite direction along the circumference of the circle centered on the first pivot axis and reduce the deviation.

A flight vehicle control method according to another aspect is a method of controlling a flight vehicle, the flight vehicle including: a main body; a thrust generating unit including one or more thrust generating subunits; one or more joints associated respectively with the one or more thrust generating subunits, each joint coupling the associated thrust generating subunit to the main body and permitting the associated thrust generating subunit to freely pivot relative to the main body along a circumference of a circle centered on a first pivot axis intersecting a direction of thrust generated by the associated thrust generating subunit; and a first detector configured to detect an angular position of the joint along the circumference of the circle centered on the first pivot axis, wherein each thrust generating subunit includes a plurality of thrust generators, each thrust generator being configured to change a magnitude of thrust to be generated independently of the other thrust generator or generators, and wherein in each thrust generating subunit, a first thrust generator group constituted by one or more of the thrust generators is arranged to generate thrust that induces a torque urging the thrust generating subunit in one direction along the circumference of the circle centered on the first pivot axis, and a second thrust generator group constituted by other one or more of the thrust generators is arranged to generate thrust that induces a torque urging the thrust generating subunit in the opposite direction along the circumference of the circle centered on the first pivot axis, the method including: if there is no deviation between an input target angular position of the joint along the circumference of the circle centered on the first pivot axis and the angular position of the joint as detected by the first detector along the circumference of the circle centered on the first pivot axis, adjusting the magnitude of the thrust generated by each thrust generator of the first thrust generator group and the magnitude of the thrust generated by each thrust generator of the second thrust generator group to achieve a balance between the torque urging the thrust generating subunit in the one direction along the circumference of the circle centered on the first pivot axis and the torque urging the thrust generating subunit in the opposite direction along the circumference of the circle centered on the first pivot axis; and if there is a deviation between the input target angular position of the joint along the circumference of the circle centered on the first pivot axis and the angular position of the joint as detected by the inclination angle detector along the circumference of the circle centered on the first pivot axis, adjusting the magnitude of the thrust generated by each thrust generator of the first thrust generator group and the magnitude of the thrust generated by each thrust generator of the second thrust generator group to break the balance between the torque urging the thrust generating subunit in the one direction along the circumference of the circle centered on the first pivot axis and the torque urging the thrust generating subunit in the opposite direction along the circumference of the circle centered on the first pivot axis and reduce the deviation.

In this configuration, the direction of thrust to be generated can be changed while the main body is held in a fixed attitude. Further, this configuration can eliminate the need for, or reduce the size of, an actuator specialized for causing the thrust generating subunit to pivot along the circumference of the circle centered on the first pivot axis in order to change the direction of the thrust generated by the thrust generating subunit. Thus, the construction of the flight vehicle can be simplified, and the weight of the body of the flight vehicle can be reduced. Additionally, the flexibility in arranging the mechanism for thrust generation can be increased, and adaptations to various forms are made possible. Further, manufacturing advantages are obtained, and a low manufacturing cost can be achieved.

Devices in accordance with the present application offer advantages to enable a flight vehicle to change the direction of thrust to be generated while maintaining the attitude of a main body of the flight vehicle.

Hereinafter, exemplary embodiments will be described with reference to the drawings. The present invention is not limited by the embodiments described below. The same or like elements are denoted by the same reference signs throughout the drawings, and will not be described repeatedly.

Throughout the following description and the drawings, the letter "A", "B", "C", or "D" added as a suffix to a reference sign is intended to indicate that the element denoted by the letter corresponds to an element denoted by a numeral or sign immediately preceding the letter. For example, a "first thrust generating subunit 3A", a "second thrust generating subunit 3B", a "third thrust generating subunit 3C", and a "fourth thrust generating subunit 3D" are each an element corresponding to a "thrust generating subunit 3". When a description is given of a particular one of the elements denoted by the suffix letters "A", "B", "C", and "D", the letter "A" "B", "C", or "D" is used to explicitly designate the element to be described. When a description concerns a feature common to the elements "A", "B", "C", and "D", the description is given without using the letters "A", "B", "C", and "D".

Embodiment 1

FIG. 1 is a perspective view illustrating an exemplary flight vehicle according to Embodiment 1.

The flight vehicle 100 is, for example, a multi-rotor aircraft capable of vertical take-off and landing. The flight vehicle 100 is, for example, a manned aircraft. The flight vehicle 100 may be an unmanned aircraft.

Figure 3:
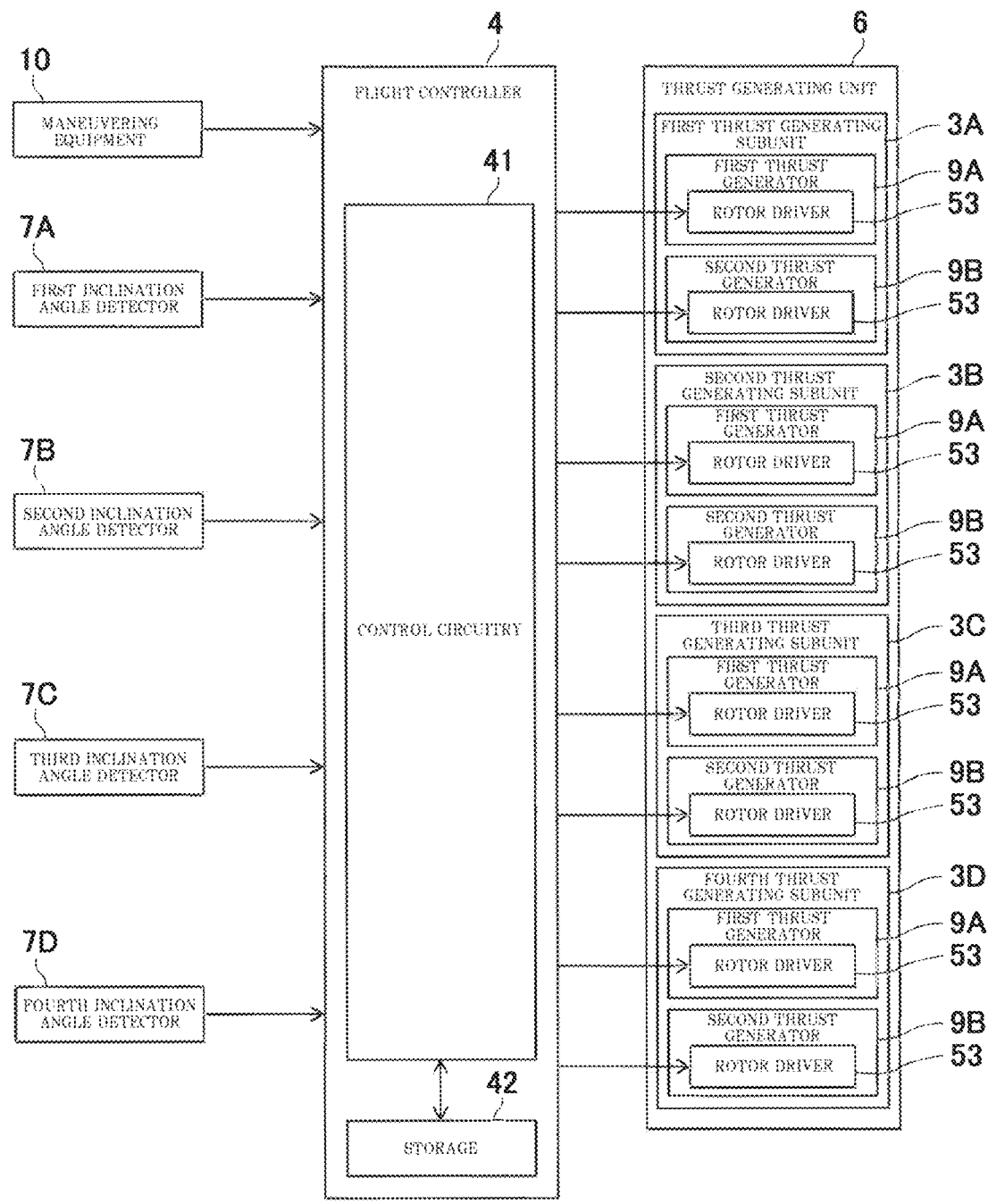
FIG. 3 is a block diagram schematically illustrating an exemplary control system of the flight vehicle of FIG. 1.

Referring to FIG. 1, the flight vehicle 100 includes a main body 1, a thrust generating unit 6 coupled to the main body 1 via a support 2 and joints 5, and a flight controller 4. Flight controller 4 is illustrated in FIG. 3.

The main body 1 may have, for example, a shape similar to that of the body of a helicopter, and is configured to allow a person such as an operator to get on board the main body 1. The main body 1 is provided with maneuvering equipment 10 for maneuvering the flight vehicle 100 and equipped with the flight controller 4. A fixed wing 11 may be mounted on the main body 1 to generate lift upon forward movement of the flight vehicle 100. In this case, the lift that the thrust generating unit 6 has to generate during high-speed flight can be reduced, and accordingly great thrust can be directed in the forward direction to allow the flight vehicle 100 to fly at a high speed. In the present embodiment, the main body 1 is located below the thrust generating unit 6. However, the main body 1 is not limited to this location. Alternatively, the main body 1 may be located above the thrust generating unit 6 or may be located in the same plane as the thrust generating unit 6.

Figure 2:
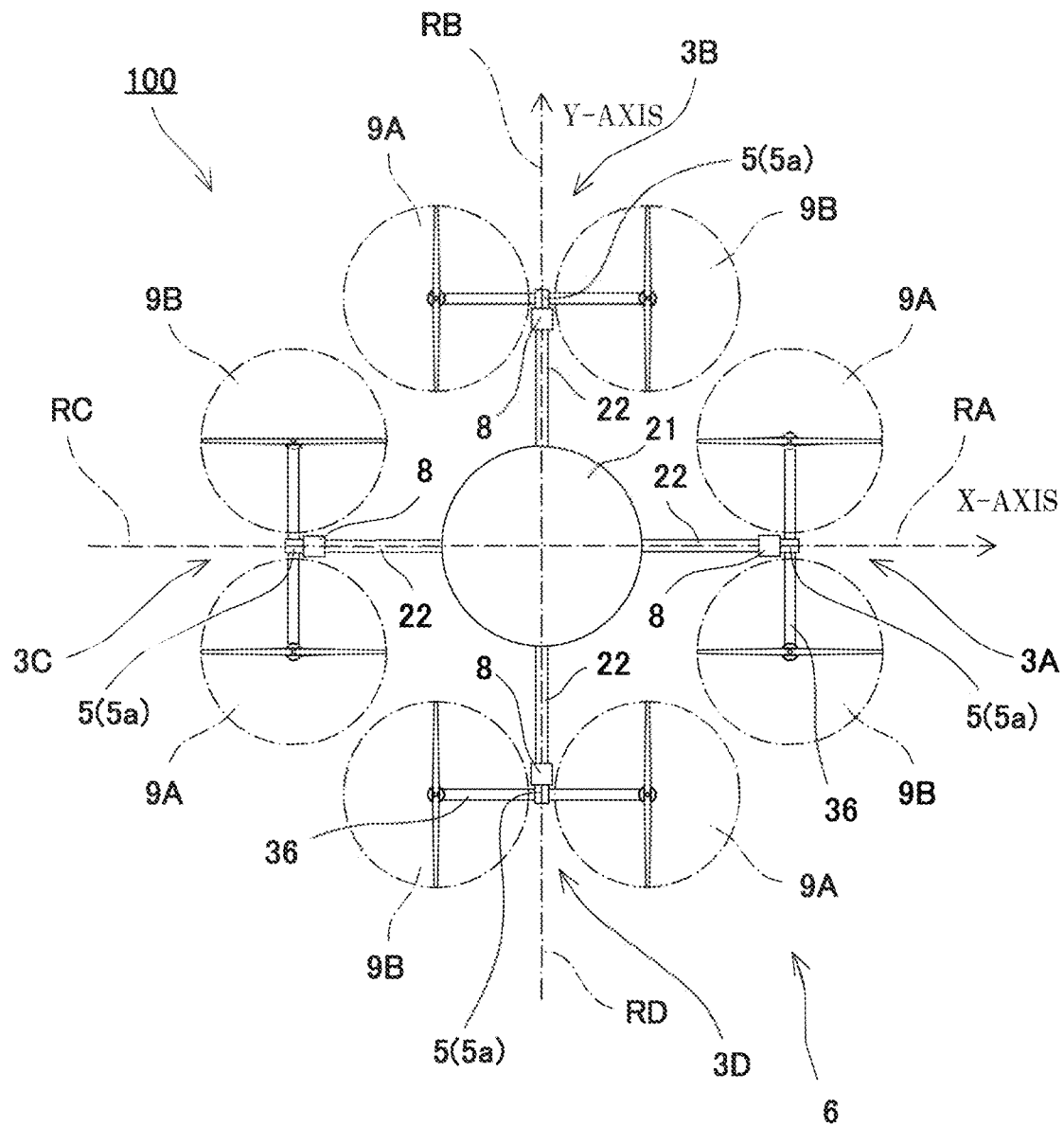
FIG. 2 is a plan view illustrating an exemplary thrust generating unit of the flight vehicle of FIG. 1.

FIG. 2 is a plan view illustrating an example configuration of the thrust generating unit 6.

The thrust generating unit 6 is, for example, a mechanism that produces an air flow and generates thrust acting in a direction opposite to the direction of the air flow. The thrust generating unit 6 includes one or more thrust generating subunits 3. In the present embodiment, for example, as shown in FIGS. 1 and 2, the thrust generating unit 6 includes a first thrust generating subunit 3A located forward of the main body 1, a second thrust generating subunit 3B located to the left of the main body 1, a third thrust generating subunit 3C located rearward of the main body 1, and a fourth thrust generating subunit 3D located to the right of the main body 1. The thrust generating subunits 3A to 3D are arranged in this order at regular intervals along the circumference of a circle centered on the yaw axis of the flight vehicle 100. That is, the four thrust generating subunits 3 are arranged to have rotational symmetries through 90-degrees in a horizontal plane.

In the following description, the forward, rearward, leftward, rightward, upward, and downward directions with respect to the main body 1 may be simply referred to as "forward", "rearward", "leftward", "rightward", "upward", and "downward".

Each thrust generating subunit 3 includes a plurality of thrust generators 9. In the present embodiment, for example, the thrust generating subunit 3 includes two thrust generators, which are respectively referred to as a first thrust generator 9A and a second thrust generator 9B. The thrust generating subunit 3 further includes a coupler in the form of a beam coupling the first and second thrust generators 9A and 9B. The coupler 36 couples the first and second thrust generators 9A and 9B to each other in such a manner that the thrust generators 9A and 9B are arranged in a line. In the present embodiment, all of the four thrust generating subunits 3 include two thrust generators. However, the thrust generating subunits 3 are not limited to the inclusion of two thrust generators.

In the present embodiment, as shown in FIG. 1, each thrust generator 9 includes a rotor 51 and a rotor driver 53 (see also FIG. 3). The same applies to all of the thrust generating subunits 3, although in FIG. 1 only the rotor and rotor driver of the first thrust generating subunit 3A are indicated by the reference signs.

The rotor 51 is a rotary wing rotatable about a predetermined rotational axis. The trajectory drawn by the rotating rotor 51 corresponds to a rotor plane. By rotating, the rotor 51 can generate thrust acting in a direction perpendicular to the rotor plane, namely in a direction in which the rotor plane faces. In FIG. 1, the rotor 51 including a rotor head 51a and two rotor blades 51b mounted on the rotor head 51a at a fixed angle of attack is shown as an example. The rotor head 51a and the rotor blades 51b may be connected via a non-illustrated joint that allows for changing the angle of attack of the rotor blades 51b.

The rotor driver 53 is a driver that rotates the rotor 51. The rotor driver 53 includes, for example, a drive source such as an electric motor, a reciprocating engine, or a gas turbine engine and a drive power transmission mechanism such as a gear train or a pulley which transmits drive power of the drive source to the rotor 51. The rotor driver 53 can change the output for rotational drive to change the magnitude of the thrust generated by the thrust generator 9 including the rotor driver 53. Each thrust generator 9 includes the rotor driver 53 and can change the magnitude of the thrust to be generated independently of the other thrust generators. When the rotor 51 is configured to allow for changing the angle of attack of the rotor blades 51b, the collective pitch may be varied to change the magnitude of the thrust generated by the thrust generator 9.

As describe above, the first thrust generator 9A and the second thrust generator 9B are each a mechanism configured to generate thrust by rotating the rotor 51. However, the generators 9A and 9B are not limited to this configuration. Alternatively, contra-rotating rotors, duct fans, or jet engines may be used.

The coupler 36 couples the first and second thrust generators 9A and 9B of the thrust generating subunit 3 to each other in such a manner that the first and second thrust generators 9A and 9B are positioned with the rotational axes of their rotors 51 extending in the same direction. Thus, the rotor planes of the first and second thrust generators 9A and 9B face in the same direction, and the directions of the thrust generated by the first and second thrust generators 9A and 9B are the same. The resultant force of the thrust generated by the first thrust generator 9A and the thrust generated by the second thrust generator 9B is thrust generated by the thrust generating subunit 3.

The support 2 connects the thrust generating unit 6 and the main body 1 together and supports the main body 1, for example, in such a manner that the main body 1 is suspended from the thrust generating unit 6. The support 2 includes a hub 21 mounted above the center of gravity of the main body 1 and support beams 22 associated respectively with the thrust generating subunits 3. The proximal ends of the support beams 22 are attached to the hub 21 and connected to the main body 1. The distal ends of the support beams 22 are attached to the thrust generating subunits 3 via the joints 5. The support 2 need not be an entity separate from the main body 1 and may be integral with the main body 1.

The joints 5 are respectively associated with the thrust generating subunits 3. Each joint 5 includes a pivoting shaft 5a freely pivotable along the circumference of a circle centered on a pivot axis R (first pivot axis) intersecting the direction of the thrust generated by the thrust generators 9 of the thrust generating subunit 3 associated with the joint 5. The joint 5 couples the coupler 36 of the thrust generating subunit 3 to the support beam 22 via the pivoting shaft 5a, and the coupler 36 is freely pivotable relative to the support beam 22 along the circumference of the circle centered on the pivot axis R. In the present embodiment, the flight vehicle 100 includes a first joint 5A associated with the first thrust generating subunit 3A, a second joint 5B associated with the second thrust generating subunit 3B, a third joint 5C associated with the third thrust generating subunit 3C, and a fourth joint 5D associated with the fourth thrust generating subunit 3D.

The first and third joints 5A and 5C respectively include pivoting shafts freely pivotable along the circumferences of circles centered on pivot axes RA and RC extending in the forward/rearward direction. Thus, the rotor planes of the thrust generators 9 of the first and third thrust generating subunits 3A and 3C can be inclined in the leftward/rightward direction by causing the first and third thrust generating subunits 3A and 3C to pivot relative to the main body 1 along the circumferences of the circles centered on the pivot axes RA and RC. That is, the pivot axes R intersect the direction in which the first and second thrust generators 9A and 9B are arranged and the direction of the thrust generated by the thrust generators 9 of the thrust generating subunit 3.

Likewise, the second and fourth joints 5B and 5D respectively include pivoting shafts freely pivotable along the circumferences of circles centered on pivot axes RB and RD extending in the leftward/rightward direction. Thus, the rotor planes of the thrust generators 9 of the second and fourth thrust generating subunits 3B and 3D can be inclined in the forward/rearward direction by causing the second and fourth thrust generating subunits 3B and 3D to pivot relative to the main body 1 along the circumferences of the circles centered on the pivot axes RB and RD.

In the present embodiment, the pivot axis RC is on the same line as the pivot axis RA, and the pivot axis RD is on the same line as the pivot axis RB. However, the pivot axes are not limited to this relationship. The direction in which each pivot axis R extends may be any direction, and each pivot axis R may extend, for example, in a direction oblique to the movement direction of the main body.

Since the rotor plane of each thrust generator 9 can be inclined with respect to a horizontal plane, the thrust generated by the thrust generator 9 can have a component acting in a direction along the horizontal plane, and thus the main body 1 can be moved in the horizontal direction in which the component acts.

Figure 4:
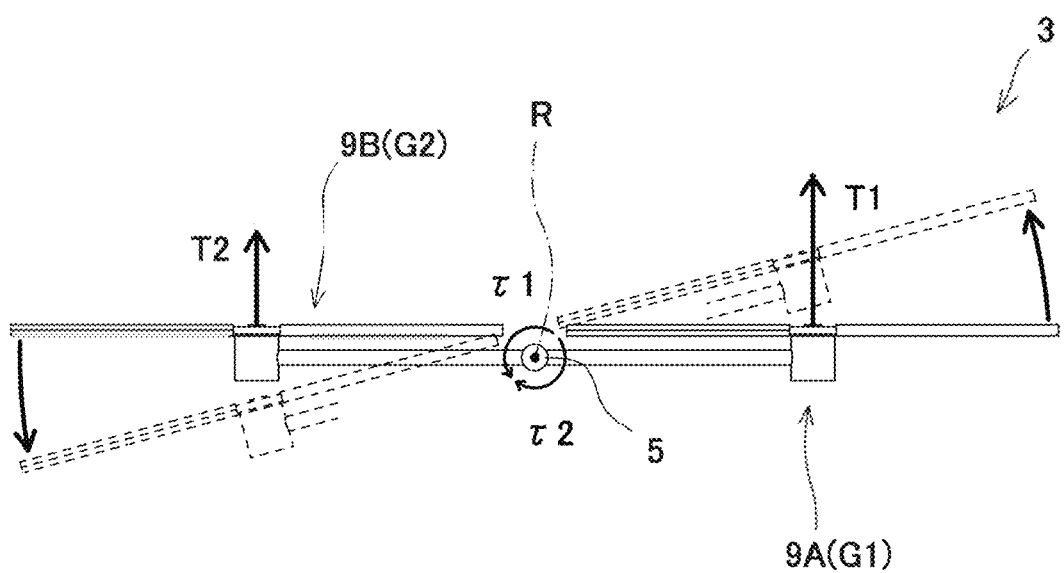
FIG. 4 is a side view illustrating an exemplary thrust generating subunit of the flight vehicle of FIG. 1.

FIG. 4 is a side view illustrating an exemplary thrust generating subunit of the flight vehicle of FIG. 1.

Referring to FIG. 4, each pivot axis R, as viewed in the direction in which it extends, is located between the first and second thrust generators 9A and 9B. Preferably, the pivot axis R is located at the midpoint between the first and second thrust generators 9A and 9B in the direction in which the first and second thrust generators 9A and 9B are arranged. Thus, the first thrust generator 9A constitutes a first thrust generator group G1, which can generate thrust that induces a torque τ1 urging the thrust generating subunit 3 in one direction along the circumference of the circle centered on the pivot axis R. The second thrust generator 9B constitutes a second thrust generator group G2, which can generate thrust that induces a torque τ2 urging the thrust generating subunit 3 in the opposite direction along the circumference of the circle centered on the pivot axis R.

Referring to FIG. 3, the main body 1 further includes an inclination angle detector 7 configured to detect information for detecting the angular position of the joint 5 along the circumference of the circle centered on the pivot axis R. In the present embodiment, the flight vehicle 100 includes four inclination angle detectors 7. In particular, the flight vehicle 100 includes a first inclination angle detector 7A associated with the first joint 5A, a second inclination angle detector 7B associated with the second joint 5B, a third inclination angle detector 7C associated with the third joint 5C, and a fourth inclination angle detector 7D associated with the fourth joint 5D. Each inclination angle detector 7 detects the angular position of the associated joint 5 along the circumference of the circle centered on the pivot axis R. The information detected by the inclination angle detector 7 is input to the flight controller 4 (see FIG. 3).

Each joint 5 includes an inclining assister 8 that stabilizes the pivoting movement of the pivoting shaft 5a of the joint 5. For example, the inclining assister 8 includes a damper element that reduces the periodic vibration of the pivoting shaft. Thus, the control of the pivoting of the thrust generating subunits 3 can be facilitated, and the behavior of the flight vehicle 100 can be stabilized.

The inclining assister 8 includes a brake element configured to, when actuated, prevent the pivoting movement of the pivoting shaft of the associated joint 5 and configured to, when deactuated, permit the pivoting movement of the pivoting shaft of the joint 5. Thus, the thrust can easily be directed in a fixed direction. The inclining assister 8 may include an actuator that generates a moment acting in such a direction as to induce the pivoting movement of the pivoting shaft of the joint 5.

FIG. 3 is a block diagram schematically illustrating an exemplary control system of the flight vehicle 100.

Referring to FIG. 3, the flight controller 4 includes, for example, a control circuitry 41 including a processor such as a CPU and a storage 42 including memories such as a ROM and a RAM. Information output from the first to fourth inclination angle detectors 7A to 7D and information output from the maneuvering equipment 10 are input to the flight controller 4. The control circuitry 41 may be implemented by a single controller that performs centralized control or by a plurality of controllers that cooperate with each other to accomplish distributed control. The control circuitry 41 controls the operations of the respective rotor drivers 53 of the first and second thrust generators 9A and 9B of each thrust generating subunit 3 based on at least one of a flight control program stored in the storage 42, the angular position of the joint 5 as detected by the inclination angle detector 7 along the circumference of the circle centered on the pivot axis, and flight control-related information including maneuver inputs provided by the operator to the maneuvering equipment 10. The control of the rotor driver 53 of the first thrust generator 9A and the control of the rotor driver 53 of the second thrust generator 9B are performed independently of each other. Thus, the control circuitry 41 allows each thrust generator 9 to change the magnitude of the thrust to be generated independently of the other thrust generators 9. The storage 42 has stored a predetermined control program, and the control circuitry 41 executes the predetermined control program to control the flight of the flight vehicle 100.

Operation Example

Hereinafter, flight control of the flight vehicle 100 will be described in detail.

Figure 5:
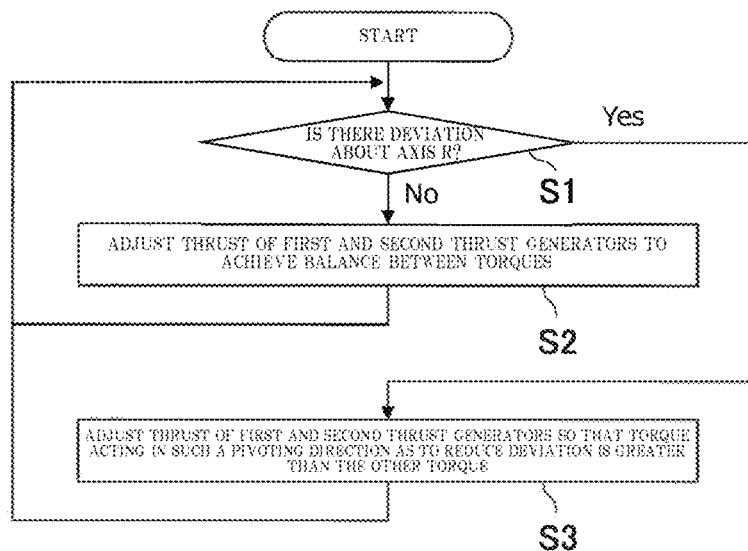
FIG. 5 is a flowchart illustrating an exemplary control process for changing the direction of thrust generated by the thrust generating subunit of the flight vehicle of FIG. 1.

FIG. 5 is a flowchart illustrating an exemplary control process for changing the direction of the thrust generated by each thrust generating subunit 3 of the flight vehicle 100.

The control of the direction of the thrust generated by each thrust generating subunit 3 will now be described.

First, the flight controller 4 determines whether there is a deviation between a target angular position of the joint 5 along the circumference of the circle centered on the pivot axis R and an angular position of the joint 5 as detected by the inclination angle detector 7 along the circumference of the circle centered on the pivot axis R (step S).

If there is no deviation between the target angular position of the joint 5 along the circumference of the circle centered on the pivot axis R and the angular position of the joint 5 as detected by the inclination angle detector 7 along the circumference of the circle centered on the pivot axis R (No in step S), the flight controller 4 adjusts the magnitude of the thrust generated by the first thrust generator 9A (first thrust generator group G1) and the magnitude of the thrust generated by the second thrust generator 9B (second thrust generator group G2) to achieve a balance between the torque $\tau1$ urging the thrust generating subunit 3 in the one direction along the circumference of the circle centered on the pivot axis R and the torque $\tau2$ urging the thrust generating subunit 3 in the opposite direction along the circumference of the circle centered on the pivot axis R (step S2). By this adjustment, the joint 5 is held in a fixed angular position along the circumference of the circle centered on the pivot axis R, and the thrust generated by the thrust generating subunit 3 is directed in a fixed direction. Thus, when any disturbing factor such as a gust is not present and the thrust generated by the thrust generating subunit 3 acts in an appropriate direction, the appropriate direction of the thrust can be maintained.

If there is a deviation between the target angular position of the joint 5 along the circumference of the circle centered on the pivot axis R and the angular position of the joint 5 as detected by the inclination angle detector 7 along the circumference of the circle centered on the pivot axis R (Yes in step S), the flight controller 4 adjusts the magnitude of the thrust generated by the first thrust generator 9A (first thrust generator group G1) and the magnitude of the thrust generated by the second thrust generator 9B (second thrust generator group G2) to break the balance between the torque $\tau1$ urging the thrust generating subunit 3 in the one direction along the circumference of the circle centered on the pivot axis R and the torque $\tau2$ urging the thrust generating subunit 3 in the opposite direction along the circumference of the circle centered on the pivot axis R. More specifically, the flight controller 4 performs the thrust adjustment such that one of the two torques which acts in such a pivoting direction as to reduce the deviation is greater than the other torque (step S3). Thus, when the target angular position has been changed, the direction of the thrust of the thrust generating subunit 3 about the pivot axis R can be appropriately adjusted to allow the actual angular position to be the changed target angular position. Additionally, when a disturbing factor such as a gust causes the thrust generating subunit 3 to pivot along the circumference of the circle centered on the pivot axis R the direction of the thrust of the thrust generating subunit 3 about the pivot axis R can be appropriately adjusted.

Referring to FIG. 4, when causing the thrust generating subunit 3 to pivot counterclockwise and be inclined downwardly from right to left, the flight controller 4 performs the thrust adjustment to make the torque 1 greater than the torque $\tau2$; for example, the flight controller 4 increases the thrust T1 generated by the first thrust generator 9A and reduces the thrust 2 generated by the second thrust generator 9B. Thus, the thrust generating subunit 3 can be inclined downwardly from right to left when viewed in FIG. 4.

Likewise, when causing the thrust generating subunit 3 to pivot clockwise and be inclined downwardly from left to right, the flight controller 4 performs the thrust adjustment to make the torque $\tau2$ greater than the torque $\tau1$; for example, the flight controller 4 reduces the thrust T1 generated by the first thrust generator 9A and increases the thrust 2 generated by the second thrust generator 9B. Thus, the thrust generating subunit 3 can be inclined downwardly from left to right when viewed in FIG. 4.

As described above, the flight controller 4 adjusts the thrust generated by the first and second thrust generators 9A and 9B, thereby causing the thrust generating subunit 3 to pivot along the circumference of the circle centered on the pivot axis R intersecting the direction of the thrust generated by the thrust generating subunit 3. Since the thrust generating subunit 3 is connected to the main body 1 via the joint 5 which is freely pivotable, the moment acting on the thrust generating subunit 3 is not transmitted to the main body 1, and the main body 1 is subjected to only the influence of the change in the thrust generated by the thrust generating subunit.

The flight controller 4 performs step S1 again.

As described above, the flight controller 4 controls each thrust generating subunit 3 such that the rotor plane of each thrust generator 9 of the thrust generating subunit 3 faces in a direction appropriate for attaining the target angular position. Thus, the direction of the thrust can be quickly changed. Additionally, the behavior of the flight vehicle 100 can be stabilized against disturbing factors such as fluctuation in atmospheric current by changing the direction and magnitude of the thrust. For example, when a disturbing factor such as a gust induces a torque urging the thrust generating subunit 3 in the one direction along the circumference of the circle centered on the pivot axis R, the flight controller 4 increases the magnitude of the thrust generated by the second thrust generator 9B (second thrust generator group G2) to increase the torque τ2 urging the thrust generating subunit 3 in the opposite direction along the circumference of the circle centered on the pivot axis R. Thus, the change in the direction of the thrust of the thrust generating subunit 3 about the pivot axis R can be prevented to stabilize the behavior of the thrust generating subunit 3 and therefore the behavior of the flight vehicle 100. A sensor that detects the torques about the pivot axis R may be provided.

The following will describe force control of the flight vehicle 100.

When moving the flight vehicle 100 in the forward/rearward direction (the direction of the X-axis), the flight controller 4 causes the rotor planes of the thrust generators 9 of the second and fourth thrust generating subunits 3B and 3D to be inclined downwardly from rear to front or from front to rear. Thus, the thrust generating unit 6 can generate thrust having a component acting in the forward/rearward direction, thereby moving the flight vehicle 100 in the forward/rearward direction. In this manner, the movement of the flight vehicle 100 in the forward/rearward direction can be controlled.

When moving the flight vehicle 100 in the leftward/rightward direction (the direction of the Y-axis), the flight controller 4 causes the rotor planes of the thrust generators 9 of the first and third thrust generating subunits 3A and 3C to be inclined downwardly from right to left or from left to right with respect to the main body 1. Thus, the thrust generating unit 6 can generate thrust having a component acting in the leftward/rightward direction, thereby moving the flight vehicle 100 in the leftward/rightward direction. In this manner, the movement of the flight vehicle 100 in the leftward/rightward direction can be controlled.

The control for the movement in the X-axis direction and the control for the movement in the Y-axis direction can be simultaneously performed in combination to move the flight vehicle 100 in a desired direction in the XY plane.

As described above, the flight vehicle 100 can change the direction of the thrust to be generated while maintaining the attitude of the main body 1. The relative relationship between the magnitudes of the thrust generated by the first and second thrust generators 9A and 9B of the thrust generating subunit 3 can be changed to cause the thrust generating subunit 3 to pivot along the circumference of the circle centered on the pivot axis R of the joint 5 connecting the thrust generating subunit 3 to the main body 1 and thereby incline the thrust generating subunit 3. This can eliminate the need for, or reduce the size of, an actuator specialized for causing the thrust generating subunit 3 to pivot along the circumference of the circle centered on the pivot axis R in order to change the direction of the thrust generated by the thrust generating subunit 3. As such, the construction of the mechanism for changing the thrust direction can be simplified, and the weight of the body of the flight vehicle can be reduced. Additionally, the flexibility in arranging the mechanism for thrust generation can be increased, and adaptations to various forms are made possible. Further, manufacturing advantages are obtained, and a low manufacturing cost can be achieved. When the thrust generator 9 is a mechanism configured to generate thrust by rotating a rotating element such as a rotor, a great force is needed to change the orientation of the thrust generator 9 because of the gyro effect. The flight vehicle 100 does not require a large-sized, specialized actuator for generating such a great force, and can have a significantly simplified construction and a significantly reduced weight.

Although the foregoing description focuses on the control for changing the direction of the thrust generated by the thrust generating subunit 3 while maintaining a fixed attitude angle of the main body 1, the attitude angle of the flight vehicle 100 may be changed. The flight controller 4 may operate to produce a thrust difference between the thrust generated by the entire first thrust generating subunit 3A and the thrust generated by the entire third thrust generating subunit 3C and thereby create a moment causing the main body 1 to rotate about the pitch axis. The flight controller 4 may operate to produce a thrust difference between the thrust generated by the entire second thrust generating subunit 3B and the thrust generated by the entire fourth thrust generating subunit 3D and thereby create a moment causing the main body 1 to rotate about the roll axis. The rotors 51 may be divided into two groups in one of which the rotors rotate in one direction and in the other of which the rotors rotate in the opposite direction, and the flight controller 4 may operate to break the balance between one of the torques about the yaw axis of the main body 1 which is produced by rotation of the rotors 51 of the one group and the other torque about the yaw axis of the main body 1 which is produced by rotation of the rotors 51 of the other group, thereby creating a moment causing the main body 1 to rotate about the yaw axis. Thus, the thrust direction control, namely the force control in the directions of the X-axis, Y-axis, and Z-axis, and the attitude control about the pitch, roll, and yaw axes can be accomplished independently of each other. The same applies to other embodiments described below.

Embodiment 2

Hereinafter, the configuration and operation of Embodiment 2 will be described with emphasis on differences from Embodiment 1.

Figure 6:
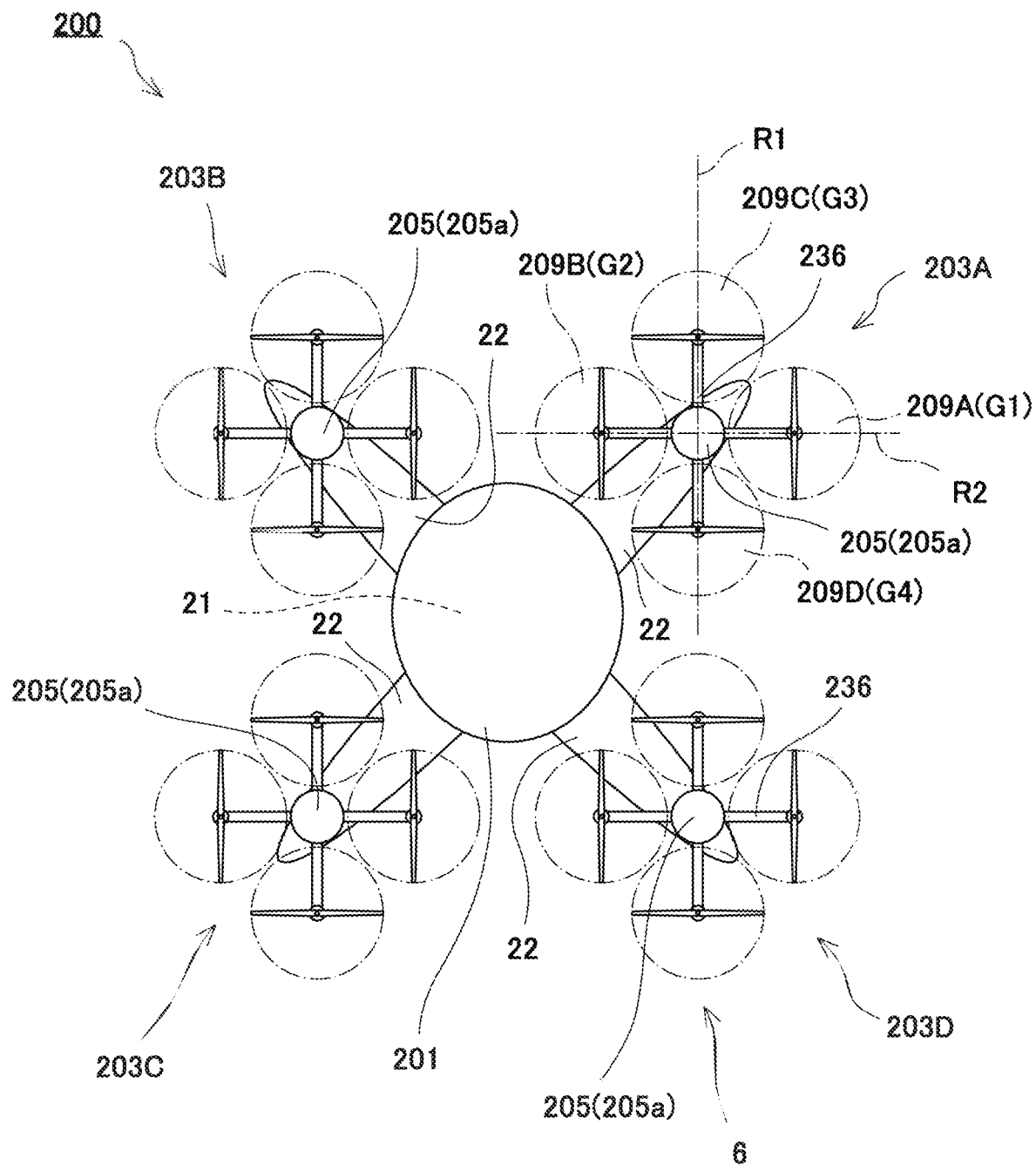
FIG. 6 is a plan view illustrating an exemplary flight vehicle according to Embodiment 2.

FIG. 6 is a plan view illustrating an exemplary configuration of a flight vehicle 200 according to Embodiment 2.

The flight vehicle 200 includes a main body 201, the thrust generating unit 6 connected to the main body 201 via joints 205, and the flight controller 4 (see FIG. 3). The main body 201 is provided with the maneuvering equipment 10 for maneuvering the flight vehicle 200 and equipped with the flight controller 4. As shown in FIG. 6, the thrust generating unit 6 includes a first thrust generating subunit 203A, a second thrust generating subunit 203B, a third thrust generating subunit 203C, and a fourth thrust generating subunit 203D. The first, second, third, and fourth thrust generating subunits 203A. 203B, 203C, and 203D are arranged in this order at regular intervals along the circumference of a circle centered on the yaw axis of the flight vehicle 200. That is, the first thrust generating subunit 203A is located forward and to the left of the main body 201, the second thrust generating subunit 203B is located rearward and to the left of the main body 201, the third thrust generating subunit 203C is located rearward and to the right of the main body 201, and the fourth thrust generating subunit 203D is located forward and to the right of the main body 201. In FIG. 6, the rightward direction on the sheet plane corresponds to the forward direction with respect to the flight vehicle 200.

Each thrust generating subunit 203 includes three or more thrust generators. In the present embodiment, each thrust generating subunit 203 includes four thrust generators, namely a first thrust generator 209A, a second thrust generator 209B, a third thrust generator 209C, and a fourth thrust generator 209D. The first, second, third, and fourth thrust generators 209A, 209B, 209C, and 209D are respectively located forward, rearward, to the left, and to the right, of the joint 205 associated with the thrust generating subunit 203. The first and second thrust generators 209A and 209B are arranged in the forward/rearward direction, and the third and fourth thrust generators 209C and 209D are arranged in the leftward/rightward direction. In the present embodiment, the first thrust generator 209A, third thrust generator 209C, second thrust generator 209B, and fourth thrust generator 209D are arranged in this order at regular intervals along the circumference of a circle centered on the yaw axis of the joint 205.

Each thrust generating subunit 203 includes a coupler 236 connecting the thrust generators 209A to 209D to one another. The coupler 236 includes coupling beams extending forward, rearward, leftward, and rightward from the joint 205. The proximal end of each coupling beam is connected to the joint 205, and one of the thrust generators 209 is secured to the distal end of each coupling beam. The coupler 236 couples the thrust generators 209A to 209D of the thrust generating subunit 203 to one another in such a manner that the thrust generators 209A to 209D are positioned with the rotational axes of their rotors 51 extending in the same direction. Thus, the rotor planes of the thrust generators 209A to 209D face in the same direction, and the directions of the thrust generated by the thrust generators 209A to 209D are the same. The other features of the thrust generating subunits 203 are the same as those of the thrust generating subunits of the previously described embodiment, and will therefore not be described in detail.

Each thrust generating subunit 203 is pivotally connected to the support beam 22 associated with the thrust generating subunit 203 via the joint 205 associated with the thrust generating subunit 203, and is connected to the main body 201 via the support beam 22.

The joints 205 will now be described. Each joint 205 includes a pivoting shaft 205a freely pivotable along the circumference of a circle centered on a pivot axis R1 (first pivot axis) intersecting the direction of the thrust generated by the thrust generating subunit 203 associated with the joint 205, the pivoting shaft 205a being further freely pivotable along the circumference of a circle centered on a pivot axis R2 (second pivot axis) intersecting the direction of the thrust generated by the thrust generating subunit 203 and intersecting the pivot axis R1. The joint 205 couples the thrust generating subunit 203 to the support beam 22 via the pivoting shaft 205a, and the thrust generating subunit 203 is freely pivotable relative to the support beam 22 along the circumferences of the circles centered on the pivot axes R1 and R2. Preferably, the pivot axes R1 and R2 are perpendicular to each other. The joint 205 is a joint having two degrees of rotational freedom, namely a universal joint. For example, the joint 205 is a cardan joint. The joint 205 connects the main body 201 and the thrust generating subunit 203 in such a manner that the rotor planes of the thrust generators 209 of the thrust generating subunit 203 can be inclined in a desired direction with respect to the XY plane. In the present embodiment, the pivot axes R1 and R2 are reference lines defined for flight control performed by the flight controller 4 and passing through the center of the universal joint; that is, the pivot axes R1 and R2 are not physical entities distinguishable from each other. However, the pivot axes R1 and R2 may be physical entities such as pivoting shafts of a cardan joint which are distinguishable from each other. The pivot axis R1 is defined to extend in a direction perpendicular to the direction in which the first and second thrust generators 209A and 209B are arranged, while the pivot axis R2 is defined to extend in a direction perpendicular to the direction in which the third and fourth thrust generators 209C and 209D are arranged.

The joint 205, as viewed in the upward/downward direction, is located in a region surrounded by the thrust generators 209A to 209D. Preferably, the joint 205 is located at the center of the region surrounded by the thrust generators 209A to 209D.

The first thrust generator 209A constitutes a first thrust generator group G1, and the thrust generated by the first thrust generator group G1 induces a torque urging the thrust generating subunit 203 in one direction along the circumference of the circle centered on the pivot axis R1. The second thrust generator 209B constitutes a second thrust generator group G2, and the thrust generated by the second thrust generator group G2 induces a torque urging the thrust generating subunit 203 in the opposite direction along the circumference of the circle centered on the pivot axis R1. Further, the third thrust generator 209C constitutes a third thrust generator group G3, and the thrust generated by the third thrust generator group G3 induces a torque urging the thrust generating subunit 203 in one direction along the circumference of the circle centered on the pivot axis R2. The fourth thrust generator 209D constitutes a fourth thrust generator group G4, and the thrust generated by the fourth thrust generator group G4 induces a torque urging the thrust generating subunit 203 in the opposite direction along the circumference of the circle centered on the pivot axis R2.

In the present embodiment, the inclination angle detector 7 detects information for detecting the angular position along the circumference of the circle centered on the pivot axis R1 and further detects information for detecting the angular position along the circumference of the circle centered on the pivot axis R2. These information detected by the inclination angle detector 7 are input to the flight controller 4 (see FIG. 3).

Operation Example

Hereinafter, flight control of the flight vehicle 200 will be described in detail.

Figure 7:
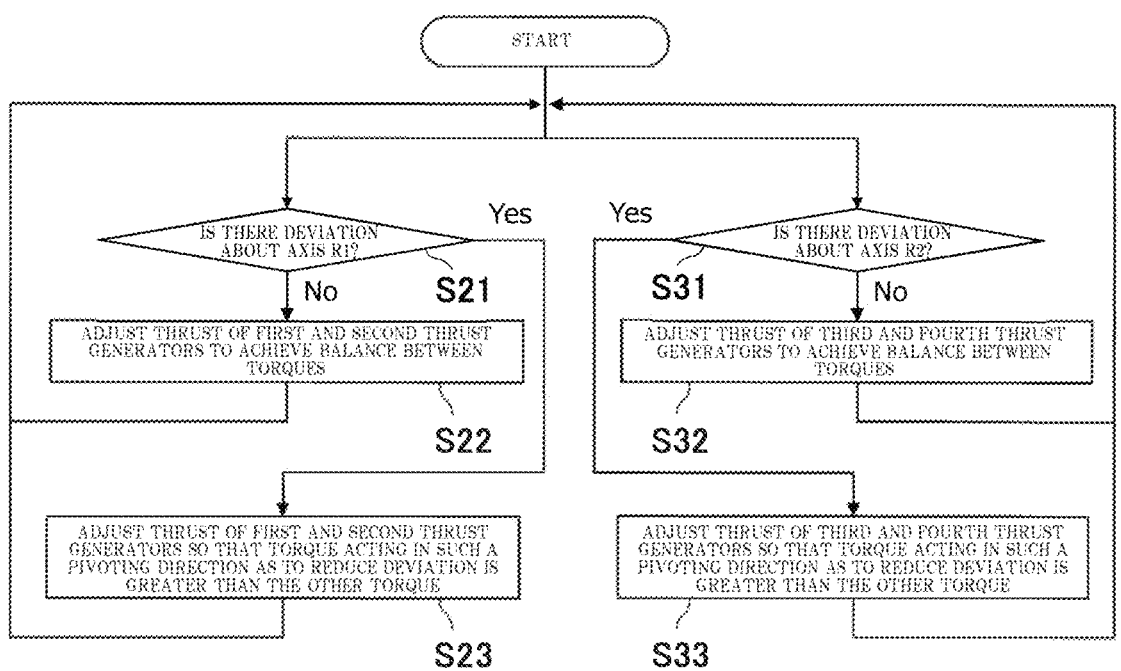
FIG. 7 is a flowchart illustrating an exemplary control process for changing the direction of thrust generated by a thrust generating subunit of the flight vehicle of FIG. 6.

FIG. 7 is a flowchart illustrating an exemplary control process for changing the direction of the thrust generated by each thrust generating subunit 203 of the flight vehicle 200.

The control of the direction of the thrust generated by each thrust generating subunit 203 will now be described.

First, the flight controller 4 determines whether there is a deviation between a target angular position of the joint 205 along the circumference of the circle centered on the pivot axis R1 and the angular position of the joint 205 as detected by the inclination angle detector 7 along the circumference of the circle centered on the pivot axis R1 (step S21).

If there is no deviation between the target angular position of the joint 205 along the circumference of the circle centered on the pivot axis R1 and the angular position of the joint 205 as detected by the inclination angle detector 7 along the circumference of the circle centered on the pivot axis R1 (No in step S21), the flight controller 4 adjusts the magnitude of the thrust generated by the first thrust generator 209A (first thrust generator group G1) and the magnitude of the thrust generated by the second thrust generator 209B (second thrust generator group G2) to achieve a balance between the torque urging the thrust generating subunit 203 in the one direction along the circumference of the circle centered on the pivot axis R1 and the torque urging the thrust generating subunit 203 in the opposite direction along the circumference of the circle centered on the pivot axis R1 (step S22). By this adjustment, the joint 205 is held in a fixed angular position along the circumference of the circle centered on the pivot axis R1, and the thrust generated by the thrust generating subunit 203 is directed in a fixed direction.

If there is a deviation between the target angular position of the joint 205 along the circumference of the circle centered on the pivot axis R1 and the angular position of the joint 205 as detected by the inclination angle detector 7 along the circumference of the circle centered on the pivot axis R1 (Yes in step S21), the flight controller 4 adjusts the magnitude of the thrust generated by the first thrust generator 209A (first thrust generator group G1) and the magnitude of the thrust generated by the second thrust generator 209B (second thrust generator group G2) to break the balance between the torque urging the thrust generating subunit 203 in the one direction along the circumference of the circle centered on the pivot axis R1 and the torque urging the thrust generating subunit 203 in the opposite direction along the circumference of the circle centered on the pivot axis R1. More specifically, the flight controller 4 performs the thrust adjustment such that one of the two torques which acts in such a pivoting direction as to reduce the deviation is greater than the other torque (step S23). Thus, the flight controller 4 can cause the thrust generating subunit 203 to pivot along the circumference of the circle centered on the pivot axis R1 so that the thrust generating subunit 203 is inclined downwardly from rear to front or from front to rear.

The flight controller 4 performs steps S31 to S33 described below simultaneously with steps S21 to S23 described above.

First, the flight controller 4 determines whether there is a deviation between a target angular position of the joint 205 along the circumference of the circle centered on the pivot axis R2 and the angular position of the joint 205 as detected by the inclination angle detector 7 along the circumference of the circle centered on the pivot axis R2 (step S31).

If there is no deviation between the target angular position of the joint 205 along the circumference of the circle centered on the pivot axis R2 and the angular position of the joint 205 as detected by the inclination angle detector 7 along the circumference of the circle centered on the pivot axis R2 (No in step S31), the flight controller 4 adjusts the magnitude of the thrust generated by the third thrust generator 209C (third thrust generator group G3) and the magnitude of the thrust generated by the fourth thrust generator 209D (fourth thrust generator group G4) to achieve a balance between the torque urging the thrust generating subunit 203 in the one direction along the circumference of the circle centered on the pivot axis R2 and the torque urging the thrust generating subunit 203 in the opposite direction along the circumference of the circle centered on the pivot axis R2 (step S32). By this adjustment, the joint 205 is held in a fixed angular position along the circumference of the circle centered on the pivot axis R2, and the thrust generated by the thrust generating subunit 203 is directed in a fixed direction.

If there is a deviation between the target angular position of the joint 205 along the circumference of the circle centered on the pivot axis R2 and the angular position of the joint 205 as detected by the inclination angle detector 7 along the circumference of the circle centered on the pivot axis R2 (Yes in step S31), the flight controller 4 adjusts the magnitude of the thrust generated by the third thrust generator 209C (third thrust generator group G3) and the magnitude of the thrust generated by the fourth thrust generator 209D (fourth thrust generator group G4) to break the balance between the torque urging the thrust generating subunit 203 in the one direction along the circumference of the circle centered on the pivot axis R2 and the torque urging the thrust generating subunit 203 in the opposite direction along the circumference of the circle centered on the pivot axis R2. More specifically, the flight controller 4 performs the thrust adjustment such that one of the two torques which acts in such a pivoting direction as to reduce the deviation is greater than the other torque (step S33). Thus, the flight controller 4 can cause the thrust generating subunit 203 to pivot along the circumference of the circle centered on the pivot axis R2 so that the thrust generating subunit 203 is inclined downwardly from right to left or from left to right.

The flight controller 4 can operate to combine the pivoting movement of the thrust generating subunit 203 along the circumference of the circle centered on the pivot axis R1 and the pivoting movement of the thrust generating subunit 203 along the circumference of the circle centered on the pivot axis R2, thereby inclining the thrust generating subunit 203 in a desired direction with respect to the XY plane.

The following will describe force control of the flight vehicle 200.

Figure 8:
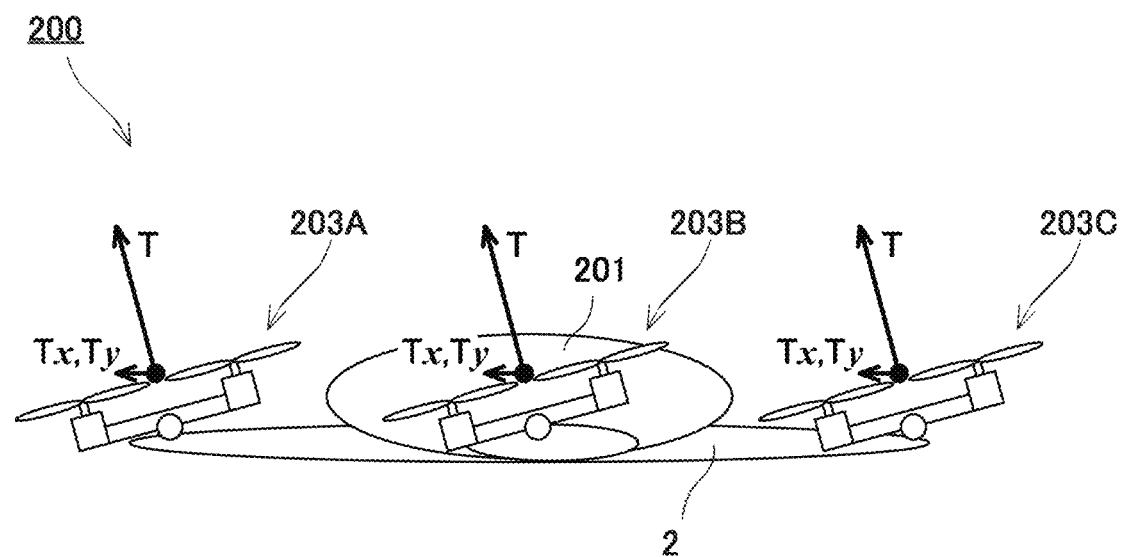
FIG. 8 is a side view illustrating exemplary operation of the thrust generating subunit of the flight vehicle of FIG. 6.

FIG. 8 is a side view illustrating an exemplary operation of each thrust generating subunit 203 of the flight vehicle 200.

In the present embodiment, when the flight vehicle 200 is moved in the XY plane, the flight controller 4 causes the rotor planes of the thrust generators 209 of the first to fourth thrust generating subunits 203A to 203D to be inclined to face in the movement direction as shown in FIG. 8. Thus, the flight controller 4 causes the thrust generating unit 6 to generate thrust T having an X-axis component Tx and a Y-axis component Ty, thereby moving the flight vehicle 200 in a desired direction in the XY plane.

As described above, all of the thrust generating subunits 203A to 203D can generate thrust acting in a desired direction in the XY plane. Thus, the magnitude of the thrust acting in the movement direction can be increased, and the body of the flight vehicle can be efficiently moved.

Embodiment 3

Hereinafter, the configuration and operation of Embodiment 3 will be described with emphasis on differences from Embodiment 2 described above.

Figure 9:
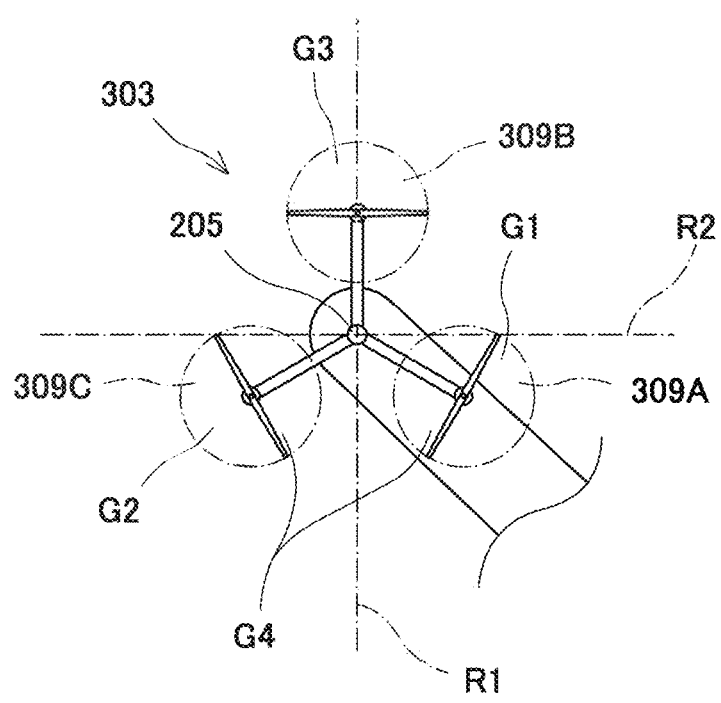
FIG. 9 is an enlarged plan view illustrating an exemplary thrust generating subunit of a flight vehicle according to Embodiment 3.

FIG. 9 is an enlarged plan view illustrating an exemplary configuration of a thrust generating subunit 303 of a flight vehicle according to Embodiment 3.

In the present embodiment, the thrust generating subunit 303 includes three thrust generators, namely a first thrust generator 309A, a second thrust generator 309B, and a third thrust generator 309C. The first thrust generator 309A is located forward and to the right of the joint 205 associated with the thrust generating subunit 303, the second thrust generator 309B is located to the left of the joint 205, and the third thrust generator 309C is located rearward and to the right of the joint 205. The first, second, and third thrust generators 309A, 309B, and 309C are arranged in this order at regular intervals along the circumference of a circle centered on the yaw axis of the joint 205.

The first thrust generator 309A constitutes a first thrust generator group G1, and the thrust generated by the first thrust generator group G1 induces a torque urging the thrust generating subunit 303 in one direction along the circumference of the circle centered on the pivot axis R1. The third thrust generator 309C constitutes a second thrust generator group G2, and the thrust generated by the second thrust generator group G2 induces a torque urging the thrust generating subunit 303 in the opposite direction along the circumference of the circle centered on the pivot axis R1. The second thrust generator 309B constitutes a third thrust generator group G3, and the thrust generated by the third thrust generator group G3 induces a torque urging the thrust generating subunit 303 in one direction along the circumference of the circle centered on the pivot axis R2. The first and third thrust generators 309A and 309C constitute a fourth thrust generator group G4, and the thrust generated by the fourth thrust generator group G4 induces a torque urging the thrust generating subunit 303 in the opposite direction along the circumference of the circle centered on the pivot axis R2.

Embodiment 4

Hereinafter, the configuration and operation of Embodiment 4 will be described with emphasis on differences from Embodiment 2 described above.

Figure 10:
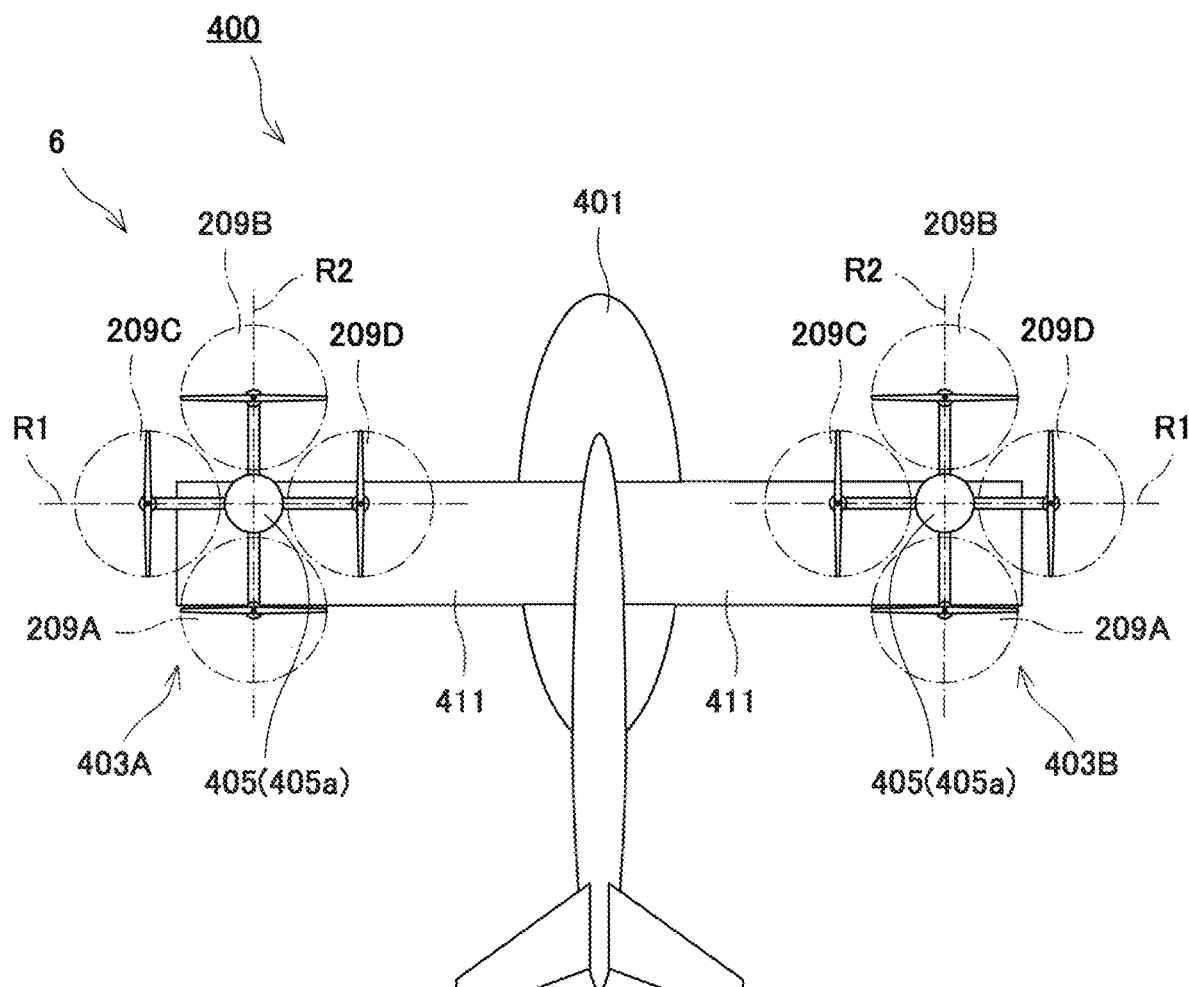
FIG. 10 is a plan view illustrating an exemplary flight vehicle according to Embodiment 4.

FIG. 10 is a plan view illustrating an exemplary configuration of a flight vehicle 400 according to Embodiment 4.

Referring to FIG. 10, the flight vehicle 400 of the present embodiment is a tilt-rotor aircraft. The flight vehicle 400 includes: a main body 401 including a pair of left and right fixed wings 411 and a tailplane; the thrust generating unit 6 connected to the fixed wings 411 via joints 405; and the flight controller 4 (see FIG. 3).

The main body 401 is in a shape similar to the body of a known fixed-wing aircraft, and configured to allow a person such as an operator to get on board the main body 401. The main body 401 is provided with the maneuvering equipment 10 for maneuvering the flight vehicle 400 and equipped with the flight controller 4. The left and right fixed wings 411 have proximal ends secured to the main body 401, and extend respectively leftward and rightward from the main body 401. The fixed wings 411 generate lift upon forward movement of the main body 401.

The thrust generating subunits of the thrust generating unit 6 include a left thrust generating subunit 403A coupled to the left fixed wing 411 and a right thrust generating subunit 403B coupled to the right fixed wing 411. The other features of the thrust generating subunits 403 are the same as those of the thrust generating subunits 203 and will therefore not be described in detail.

Each joint 405 includes a pivoting shaft 405a freely pivotable along the circumference of a circle centered on a pivot axis R1 intersecting the direction of the thrust generated by the thrust generating subunit 403 associated with the joint 405, the pivoting shaft 405a being further freely pivotable along the circumference of a circle centered on a pivot axis R2 intersecting the direction of the thrust generated by the thrust generating subunit 403 and intersecting the pivot axis R1. The thrust generating subunits 403 are coupled to the fixed wings 411 via the pivoting shafts 405a. The pivot axis R1 extends in the leftward/rightward direction, namely the direction in which the fixed wings 411 extend. Thus, each joint 405 couples the associated thrust generating subunit 403 to the main body 401 in such a manner that the thrust generating subunit 403 is freely pivotable between a first angular position P401 (see FIG. 1A) where the rotor planes of the thrust generators 209 of the thrust generating subunit 403 face upward and a second angular position P402 (see FIG. 11B) where the rotor planes of the thrust generators 209 of the thrust generating subunit 403 face forward. The other features of the joints 405 are the same as those of the joints 205 and will therefore not be described in detail.

Operation Example

Figure 11A:
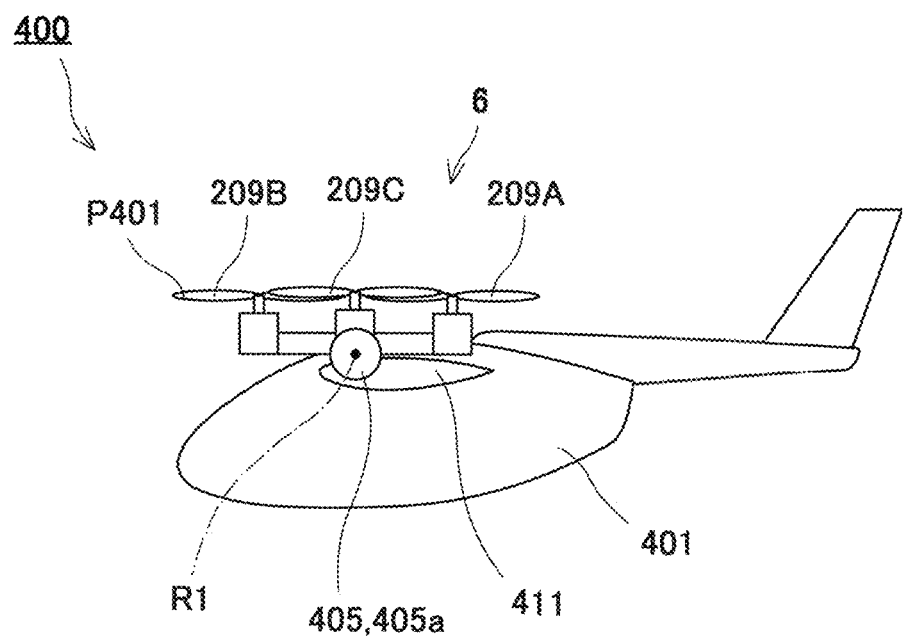
FIG. 11A is a side view illustrating exemplary operation of the flight vehicle of FIG. 10, showing the flight vehicle with a thrust generating subunit in a first angular position.
Figure 11B:
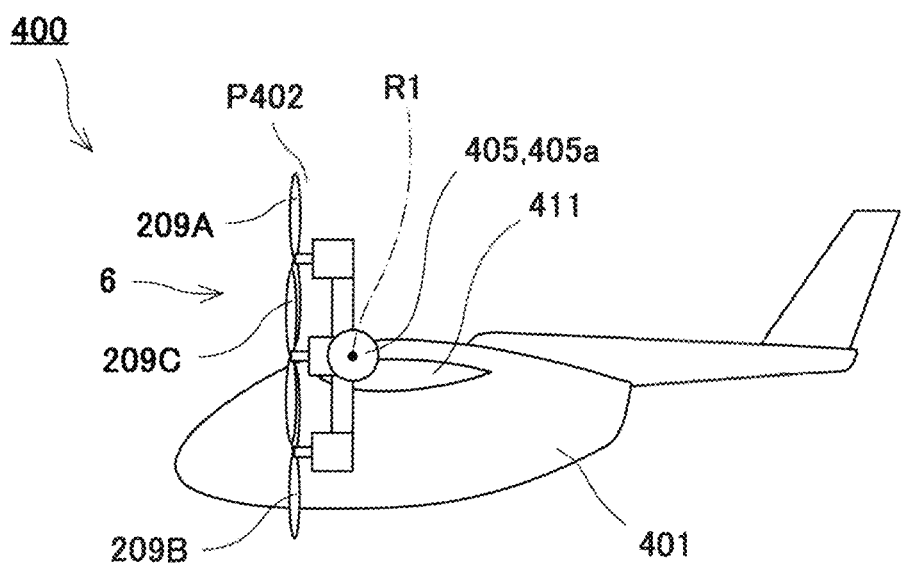
FIG. 11B is a side view illustrating exemplary operation of the flight vehicle of FIG. 10, showing the flight vehicle with the thrust generating subunit in a second angular position.

FIGS. 11A and 11B are side views illustrating exemplary operation of the flight vehicle 400. FIG. 11A shows the flight vehicle 400 with the thrust generating subunit 403 in the first angular position P401, and FIG. 11B shows the flight vehicle 400 with the thrust generating subunit 403 in the second angular position P402.

Referring to FIG. 11A, when the flight vehicle 400 attempts to shift from level flight to hovering or attempts to land, the flight controller 4 adjusts the thrust generated by the first thrust generator 209A and the thrust generated by the second thrust generator 209B to break the balance between the torque urging the thrust generating subunit 403 in one direction along the circumference of the circle centered on the pivot axis R1 and the torque urging the thrust generating subunit 403 in the opposite direction along the circumference of the circle centered on the pivot axis R. More specifically, the flight controller 4 performs the thrust adjustment such that the torque acting in the opposite direction along the circumference of the circle centered on the pivot axis R1 is greater than the torque acting in the one direction along the circumference of the circle centered on the pivot axis R1. This allows the thrust generating subunit 403 to pivot from the second angular position P402 toward the first angular position P401 and direct the rotor planes of the thrust generators 209 upward to generate a great magnitude of upward thrust.

When the flight vehicle 400 is moved in the leftward/rightward direction (the direction of the Y-axis) during hovering, the flight controller 4 adjusts the thrust generated by the third and fourth thrust generators 209C and 209D to incline the thrust generating subunit 403 in the leftward/rightward direction. This allows the thrust generating unit 6 to generate thrust having a component acting in the leftward/rightward direction, thereby moving the flight vehicle 400 in the leftward/rightward direction.

Referring to FIG. 11B, when the flight vehicle 400 attempts to shift from hovering to level flight or attempts to take off, the flight controller 4 adjusts the thrust generated by the first thrust generator 209A and the thrust generated by the second thrust generator 209B to break the balance between the torque urging the thrust generating subunit 403 in the one direction along the circumference of the circle centered on the pivot axis R1 and the torque urging the thrust generating subunit 403 in the opposite direction along the circumference of the circle centered on the pivot axis R1. More specifically, the flight controller 4 performs the thrust adjustment such that the torque acting in the one direction along the circumference of the circle centered on the pivot axis R1 is greater than the torque acting in the opposite direction along the circumference of the circle centered on the pivot axis R1. This allows the thrust generating subunit 403 to pivot from the first angular position P401 toward the second angular position P402 and direct the rotor planes of the thrust generators 209 forward to generate a great magnitude of forward thrust. As such, the flight speed can be increased.

As described above, the flight vehicle 400 can use the thrust of the thrust generating subunit 403 to cause the thrust generating subunit 403 to pivot between the first and second angular positions P401 and P402. This can eliminate the need for, or reduce the size of, an actuator specialized for causing the thrust generating subunit 403 to pivot between the first and second angular positions P401 and P402. Thus, the construction of the tilt mechanism for changing the thrust direction can be simplified to reduce the weight of the body of the flight vehicle while both hovering performance and high-speed flight performance are ensured.

In order to allow the flight vehicle 400 having the fixed wings 411 to fly at a high speed, the size of the thrust generating subunit 403 needs to be large, and therefore the gyro effect is increased. In conventional cases where a specialized actuator is used to permit the thrust generating subunit 403 to pivot, the actuator also needs to be large-sized, and many restrictions are imposed on the construction of the body of the flight vehicle. The configuration described above allows for simplifying the construction of the body of the flight vehicle and easing the restrictions on the construction of the body of the flight vehicle.

Additionally, the need for a cyclic pitch control mechanism provided for control of the body attitude in a tilt-rotor aircraft or a common helicopter can be eliminated, and the construction of the rotor mechanism can be simplified while both hovering performance and high-speed flight performance are ensured.

Embodiment 5

Hereinafter, the configuration and operation of Embodiment 5 will be described with emphasis on differences from Embodiment 2 described above.

Figure 12:
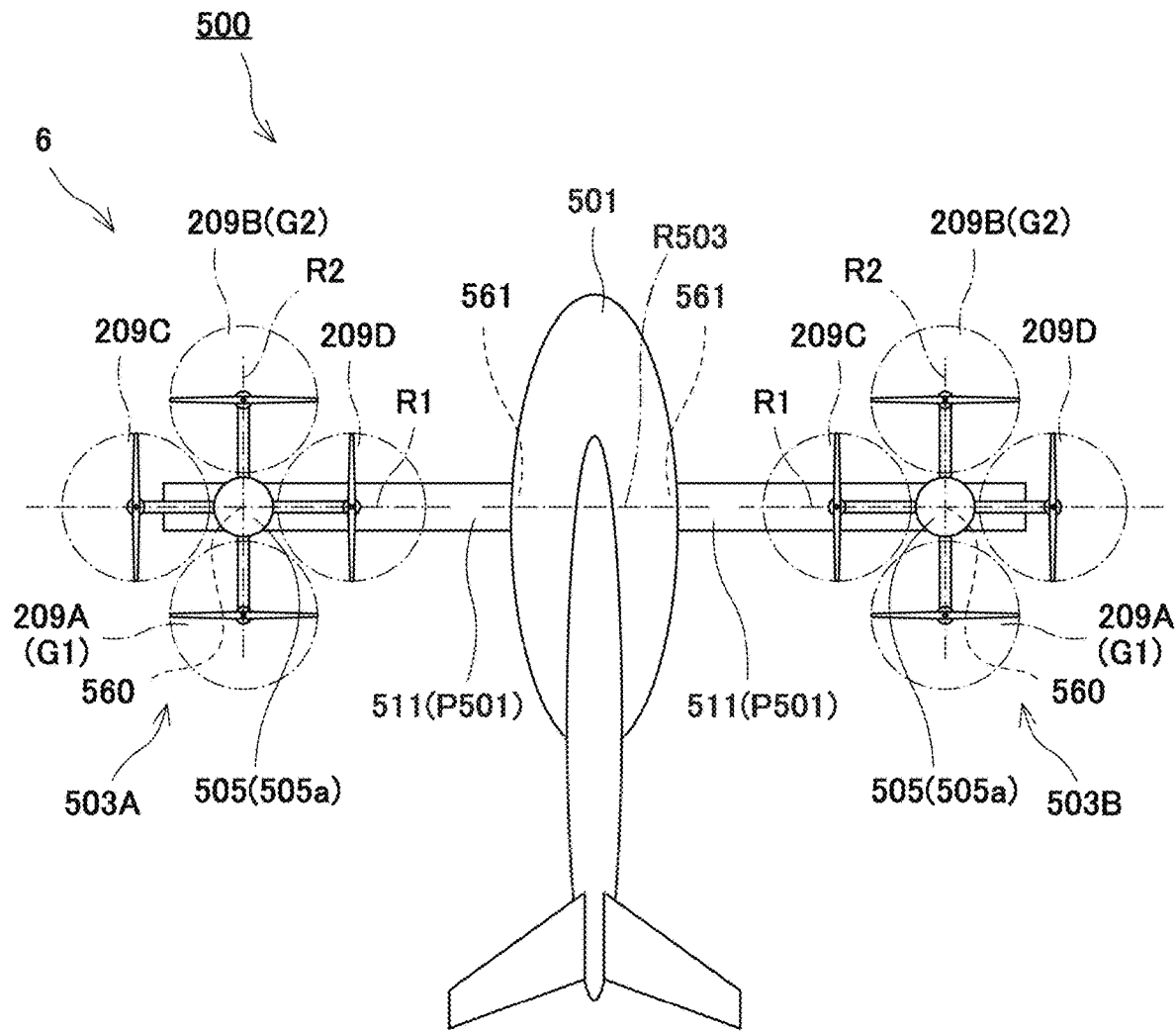
FIG. 12 is a plan view illustrating an exemplary flight vehicle according to Embodiment 5.

FIG. 12 is a plan view illustrating an exemplary configuration of a flight vehicle 500 according to Embodiment 5.

Referring to FIG. 12, the flight vehicle 500 of the present embodiment is a tilt-wing aircraft. The flight vehicle 500 includes: a main body 501 including a pair of left and right fixed wings 511 and a tailplane; the thrust generating unit 6 connected to the fixed wings 511 via joints 505; joint locks (joint locking mechanism) 560; fixed wing locks (fixed wing locking mechanism) 561; and the flight controller 4 (see FIG. 3).

The main body 501 is configured in the same manner as the main body 401, except for the fixed wings 511. Each fixed wing 511 has a proximal end coupled to the body of the flight vehicle in such a manner that the fixed wing is swingable (or freely pivotable) between a first angular position P501 and a second angular position P502 along the circumference of a circle centered on a fixed wing pivot axis R503 parallel to the pivot axis R1 of the joint 505. The first angular position P501 is a position where the chord of the fixed wing extends in an upward/downward direction, and the second angular position P502 is a position where the chord extends in a horizontal direction. The left and right fixed wings 511 extend respectively leftward and rightward from the main body 501. When placed in the second angular position P502, each fixed wing 511 generates lift upon forward movement of the main body 501. The "horizontal direction" mentioned above refers to such a direction that the fixed wing 511 can attain lift required for level flight. For example, the "horizontal direction" includes angular positions of less than 10 degrees from the horizontal. That is, the "horizontal direction" mentioned above is not limited to the direction perpendicular to the gravity direction. Likewise, the "upward/downward direction" mentioned above is not limited to the gravity direction, and refers to such a direction that the fixed wing 511 is in a position closer to the upright position than the second angular position P502 and that a rearward component of the air flow created by the thrust generators 209 is less likely to be disturbed by the fixed wing 511.

The thrust generating subunits of the thrust generating unit 6 include a left thrust generating subunit 503A coupled to the left fixed wing 511 and a right thrust generating subunit 503B coupled to the right fixed wing 511.

The first thrust generator 209A of the thrust generating subunit 503 constitutes a first thrust generator group G1, and the thrust generated by the first thrust generator group G induces a torque urging the thrust generating subunit 503 and the fixed wing 511 in one direction, namely a direction from the first angular position P501 toward the second angular position P502, along the circumferences of circles centered on the pivot axis R1 and the fixed wing pivot axis R503. The second thrust generator 209B constitutes a second thrust generator group G2, and the thrust generated by the second thrust generator group G2 induces a torque urging the thrust generating subunit 503 and the fixed wing 511 in the opposite direction, namely a direction from the second angular position P502 toward the first angular position P501, along the circumferences of the circles centered on the pivot axis R1 and the fixed wing pivot axis R503. The other features of the thrust generating subunits 503 are the same as those of the thrust generating subunits 203 and will therefore not be described in detail.

Each joint 505 includes a pivoting shaft 505a freely pivotable along the circumference of the circle centered on the pivot axis R1 intersecting the direction of the thrust generated by the thrust generating subunit 503 associated with the joint 505, the pivoting shaft 505a being further freely pivotable along the circumference of a circle centered on a pivot axis R2 intersecting the direction of the thrust generated by the thrust generating subunit 503 and intersecting the pivot axis R1. The thrust generating subunits 503 are coupled to the fixed wings 511 via the pivoting shafts 505a. The pivot axis R1 extends in the leftward/rightward direction, namely the direction in which the fixed wings 511 extend. The other features of the joints 505 are the same as those of the joints 205 and will therefore not be described in detail.

Each joint lock 560 is, for example, a brake, and at least configured to prevent and permit the movement of the joint 505 along the circumference of the circle centered on the pivot axis R1 of the joint 505. Specifically, the joint lock 560, when actuated, operates to cause the joint 505 to lose the degree of freedom of movement along the circumference of the circle centered on the pivot axis R1. The joint lock 560, when deactuated, operates to allow the joint 505 to have the degree of freedom of movement along the circumference of the circle centered on the pivot axis R1.

Each fixed wing lock 561 is, for example, a brake, and prevents and permits the movement of the fixed wing 511 along the circumference of the circle centered on the fixed wing pivot axis R503 of the fixed wing 511. Specifically, the fixed wing lock 561, when actuated, operates to cause the fixed wing 511 to lose the degree of freedom of movement along the circumference of the circle centered on the fixed wing pivot axis R503. The fixed wing lock 561, when deactuated, operates to allow the fixed wing 511 to have the degree of freedom of movement along the circumference of the circle centered on the fixed wing pivot axis R503.

In the present embodiment, the flight controller 4 further controls the actuation and deactuation of the joint locks 560 and the fixed wing locks 561.

Operation Example

Figure 13A:
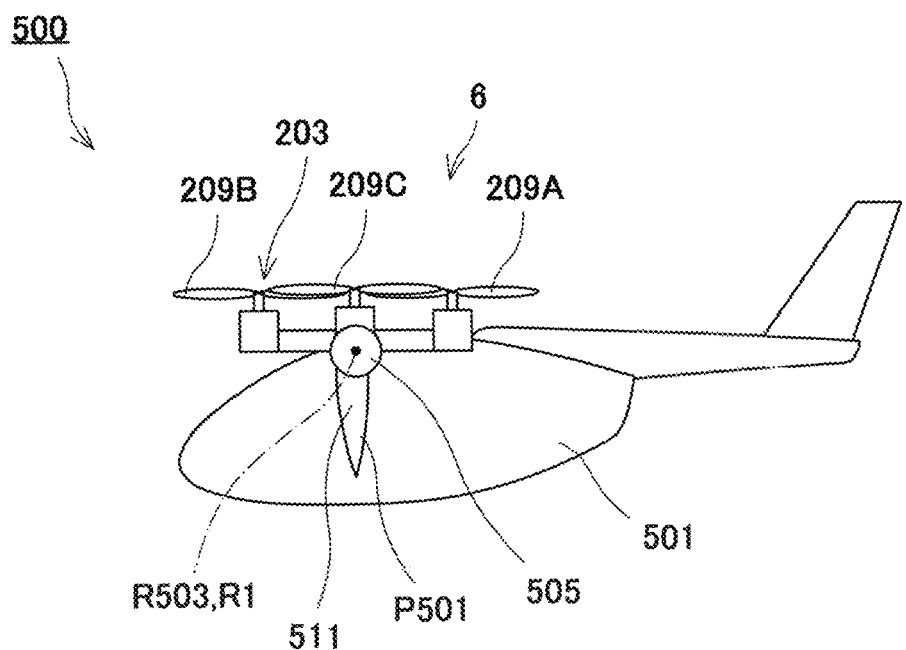
FIG. 13A is a side view illustrating exemplary operation of the flight vehicle of FIG. 12, showing the flight vehicle with a thrust generating subunit in a first angular position.
Figure 13B:
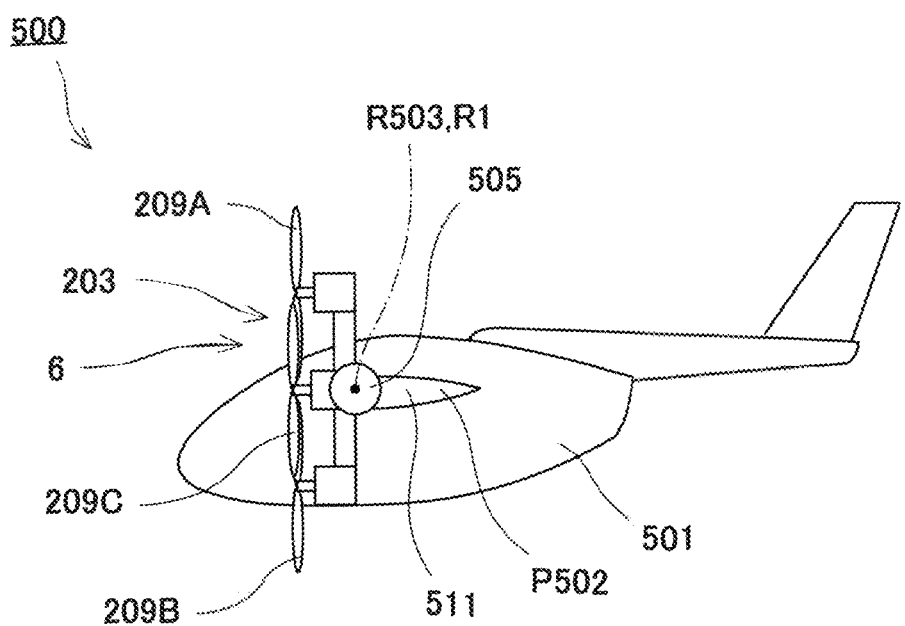
FIG. 13B is a side view illustrating exemplary operation of the flight vehicle of FIG. 12, showing the flight vehicle with the thrust generating subunit in a second angular position.

FIGS. 13A and 13B are side views illustrating exemplary operation of the flight vehicle 500. FIG. 13A shows the flight vehicle 500 with the thrust generating subunit 503 and fixed wing 511 in the first angular position P501, and FIG. 13B shows the flight vehicle 500 with the thrust generating subunit 503 and fixed wing 511 in the second angular position P502.

Referring to FIG. 13A, when the flight vehicle 500 attempts to shift from level flight to hovering or attempts to land, the flight controller 4 actuates the joint lock 560 to cause the joint 505 to lose the degree of freedom of movement along the circumference of the circle centered on the pivot axis R1. Meanwhile, the flight controller 4 deactuates the fixed wing lock 561 to permit the fixed wing 511 to pivot along the circumference of the circle centered on the fixed wing pivot axis R503.

Subsequently, the flight controller 4 adjusts the thrust generated by the first thrust generator 209A (first thrust generator group G1) and the thrust generated by the second thrust generator 209B (second thrust generator group G2) to break the balance between the torque urging the thrust generating subunit 503 and the fixed wing 511 in the one direction along the circumferences of the circles centered on the pivot axis R1 and the fixed wing pivot axis R503 and the torque urging the thrust generating subunit 503 and the fixed wing 511 in the opposite direction along the circumferences of the circles centered on the pivot axis R1 and the fixed wing pivot axis R503. More specifically, the flight controller 4 performs the thrust adjustment such that the torque urging the thrust generating subunit 503 and the fixed wing 511 in the opposite direction along the circumferences of the circles centered on the pivot axis R1 and the fixed wing pivot axis R503 is greater than the torque urging the thrust generating subunit 503 and the fixed wing 511 in the one direction along the circumferences of the circles centered on the pivot axis R1 and the fixed wing pivot axis R503. Since the movement of the joint 505 is prevented by the joint lock 560, the fixed wing 511 and the thrust generators 209 can pivot from the second angular position P502 toward the first angular position P501 to direct the rotor planes of the thrust generators 209 upward.

During hovering, the flight controller 4 deactuates the joint lock 560 to permit the joint 505 to pivot about the pivot axis R1. The flight controller 4 actuates the fixed wing lock 561 to cause the fixed wing 511 to lose the degree of freedom of movement along the circumference of the circle centered on the fixed wing pivot axis R503. Since the movement of the fixed wing 511 is prevented by the fixed wing lock 561, only the joint 505 moves to incline the thrust generating subunit 503 in a desired direction, thereby allowing the flight vehicle 500 to move in a desired direction in the XY plane.

Referring to FIG. 13B, when the flight vehicle 500 attempts to shift from hovering to level flight or attempts to take off, the flight controller 4 actuates the joint lock 560 to cause the joint 505 to lose the degree of freedom of movement along the circumference of the circle centered on the pivot axis R1. The flight controller 4 deactuates the fixed wing lock 561 to permit the fixed wing 511 to pivot along the circumference of the circle centered on the fixed wing pivot axis R503.

Subsequently, the flight controller 4 adjusts the thrust generated by the first thrust generator 209A (first thrust generator group G1) and the thrust generated by the second thrust generator 209B (second thrust generator group G2) to break the balance between the torque urging the thrust generating subunit 503 and the fixed wing 511 in the one direction along the circumferences of the circles centered on the pivot axis R1 and the fixed wing pivot axis R503 and the torque urging the thrust generating subunit 503 and the fixed wing 511 in the opposite direction along the circumferences of the circles centered on the pivot axis R1 and the fixed wing pivot axis R503. More specifically, the flight controller 4 performs the thrust adjustment such that the torque urging the thrust generating subunit 503 and the fixed wing 511 in the one direction along the circumferences of the circles centered on the pivot axis R1 and the fixed wing pivot axis R503 is greater than the torque urging the thrust generating subunit 503 and the fixed wing 511 in the opposite direction along the circumferences of the circles centered on the pivot axis R1 and the fixed wing pivot axis R503. Since the movement of the joint 505 is prevented by the joint lock 560, the fixed wing 511 can pivot from the first angular position P501 toward the second angular position P502 to direct the rotor planes of the thrust generators 209 forward. As such, the flight speed can be increased.

As described above, in the flight vehicle 500, the rotor mechanism and the tilt mechanism can be simplified as in the tilt-rotor aircraft according to Embodiment 4 previously described. Further, in the flight vehicle 500, when the rotor planes of the thrust generators 209 face upward, the fixed wings 511 are located in the first angular position P501 where the chords extend in the upward/downward direction. Thus, a rearward component of the air flow created by the thrust generators 209 is less likely to be disturbed by the fixed wings 511, and the efficiency of hovering can be improved.

Embodiment 6

Hereinafter, the configuration and operation of Embodiment 6 will be described with emphasis on differences from Embodiment 5 described above.

Figure 14:
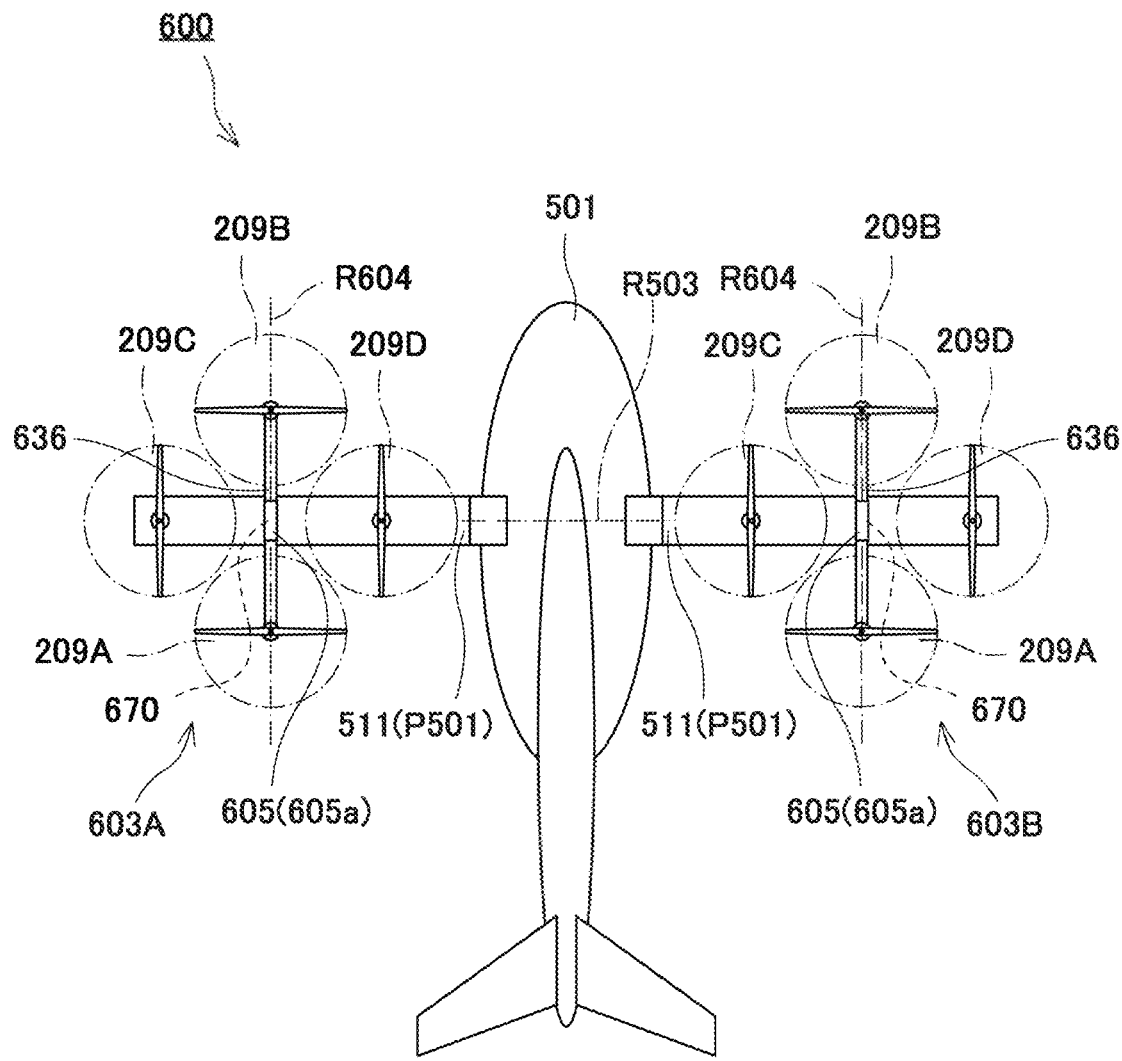
FIG. 14 is a plan view illustrating an exemplary flight vehicle according to Embodiment 6.

FIG. 14 is a plan view illustrating an exemplary configuration of a flight vehicle 600 according to Embodiment 6.

Referring to FIG. 14, the flight vehicle 600 of the present embodiment is a tilt-wing aircraft like the flight vehicle of Embodiment 5 described above. The flight vehicle 600 includes the main body 501, the thrust generating unit 6 connected to the fixed wings 511 via joints 605, coupler drivers 670, and the flight controller 4 (see FIG. 3).

The thrust generating subunits of the thrust generating unit 6 include a left thrust generating subunit 603A coupled to the left fixed wing 511 and a right thrust generating subunit 603B coupled to the right fixed wing 511.

Each thrust generating subunit 603 includes four thrust generators, namely the first thrust generator 209A, the second thrust generator 209B, the third thrust generator 209C, and the fourth thrust generator 209D. The third and fourth thrust generators 209C and 209D are mounted on the fixed wing 511 and located in the vicinity of the leading edge of the fixed wing 511. The first and second thrust generators 209A and 209B are arranged in the thickness direction of the fixed wing 511 and located at the midpoint between the third and fourth thrust generators 209C and 209D in the span direction of the fixed wing 511 (the leftward/rightward direction of the flight vehicle 600). Each thrust generating subunit 603 includes a coupler 636 in the form of a beam coupling the first and second thrust generators 209A and 209B.

Each joint 605 includes a pivoting shaft 605a freely pivotable about a coupler pivot axis R604 intersecting the chord direction and span direction of the fixed wing 511, and the coupler 636 of the thrust generating subunit 603 is coupled to the fixed wing 511 via the pivoting shaft 605a.

Thus, the thrust generated by the first thrust generator 209A induces a torque urging the fixed wing 511 via the thrust generating subunit 603 in one direction along the circumference of a circle centered on the fixed wing pivot axis R503, and the thrust generated by the second thrust generator 209B induces a torque urging the fixed wing 511 via the thrust generating subunit 603 in the opposite direction along the circumference of the circle centered on the fixed wing pivot axis R503.

The coupler driver 670 is a driver that causes the coupler 636 to pivot along the circumference of a circle centered on the coupler pivot axis R604, and can incline the first and second thrust generators 209A and 209B in the leftward/rightward direction.

In the present embodiment, the flight controller 4 further controls the operation of the coupler driver 670.

Operation Example

Hereinafter, flight control of the flight vehicle 600 will be described in detail.

First, when the flight vehicle 600 attempts to shift from level flight to hovering or attempts to land, the flight controller 4 adjusts the thrust generated by the first thrust generator 209A and the thrust generated by the second thrust generator 209B to break the balance between the torque urging the fixed wing 511 in the one direction along the circumference of the circle centered on the fixed wing pivot axis R503 and the torque urging the fixed wing 511 in the opposite direction along the circumference of the circle centered on the fixed wing pivot axis R503. More specifically, the flight controller 4 performs the thrust adjustment such that the torque urging the fixed wing 511 in the opposite direction along the circumference of the circle centered on the fixed wing pivot axis R503 is greater than the torque urging the fixed wing 511 in the one direction along the circumference of the circle centered on the fixed wing pivot axis R503. This allows the fixed wing 511 and the thrust generating subunit 603 to pivot from the second angular position P502 toward the first angular position P501 and direct the rotor planes of the thrust generators 209 upward.

When the flight vehicle 600 is moved in the leftward/rightward direction (the direction of the Y-axis) during hovering, the flight controller 4 controls the coupler drivers 670 to cause the couplers 636 to pivot, thereby inclining the first and second thrust generators 209A and 209B of each thrust generating subunit 603 in the leftward-rightward direction. This allows the thrust generating unit 6 to generate thrust having a component acting in the leftward/rightward direction, thereby moving the flight vehicle 600 in the leftward/rightward direction. In this manner, the movement of the flight vehicle 600 in the leftward/rightward direction can be controlled.

When the flight vehicle 600 attempts to shift from hovering to level flight or attempts to take off, the flight controller 4 adjusts the thrust generated by the first thrust generator 209A and the thrust generated by the second thrust generator 209B to break the balance between the torque urging the fixed wing 511 in the one direction along the circumference of the circle centered on the fixed wing pivot axis R503 and the torque urging the fixed wing 511 in the opposite direction along the circumference of the circle centered on the fixed wing pivot axis R503. More specifically, the flight controller performs the thrust adjustment such that the torque urging the fixed wing 511 in the one direction along the circumference of the circle centered on the fixed wing pivot axis R503 is greater than the torque urging the fixed wing 511 in the opposite direction along the circumference of the circle centered on the fixed wing pivot axis R503. This allows the fixed wing 511 and the thrust generating subunit 603 to pivot from the first angular position P501 toward the second angular position P502 and direct the rotor planes of the thrust generators 209 forward. As such, the flight speed can be increased.

Embodiment 7

Hereinafter, the configuration and operation of Embodiment 7 will be described with emphasis on differences from Embodiment 2 described above.

Figure 15:
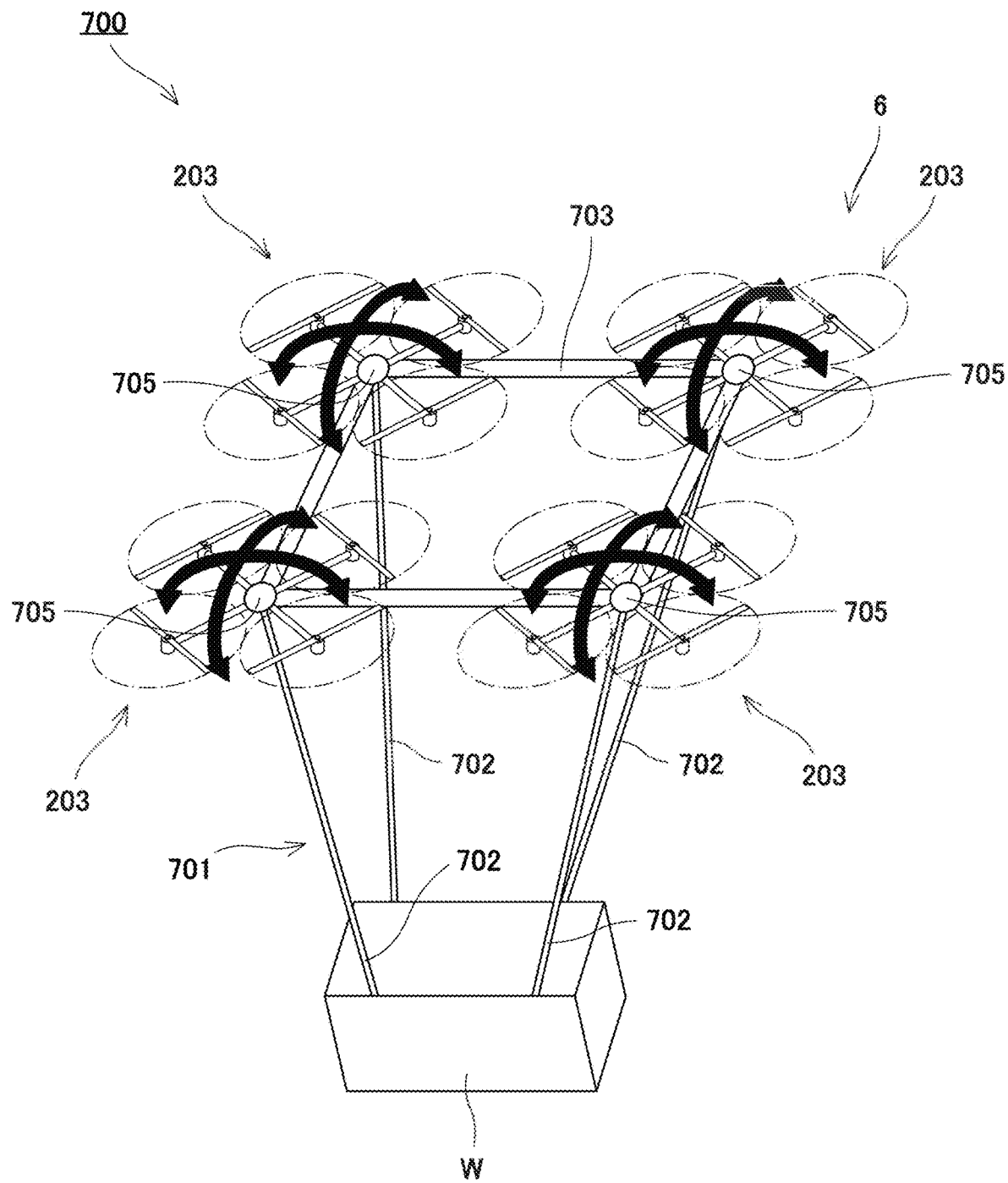
FIG. 15 is a perspective view illustrating an exemplary flight vehicle according to Embodiment 7.

FIG. 15 is a perspective view illustrating an exemplary configuration of a flight vehicle 700 according to Embodiment 7.

Referring to FIG. 15, the flight vehicle 700 of the present embodiment includes a main body 701, the thrust generating unit 6 connected to the main body 701 via joints 705, and the flight controller 4 (see FIG. 3).

The main body 701 includes a plurality of suspension cables 702 and a suspender 703 that suspends a cargo W via the plurality of suspension cables 702. The suspension cables 702 hang from different locations on the suspender 703.

Each joint 705 includes a pivoting shaft freely pivotable along the circumference of a circle centered on a pivot axis R1 extending in the forward/rearward direction and freely pivotable along the circumference of a circle centered on a pivot axis R2 extending in the leftward/rightward direction. The thrust generating subunits 203 are coupled to the suspender 703 via the pivoting shafts.

Flight control of the flight vehicle 700 is performed in the same manner as that of the flight vehicle 200 of Embodiment 2 described above. Specifically, the rotor planes of the thrust generating subunits 203 can be inclined to face in the movement direction to allow the thrust generating unit 6 to generate thrust having an X-axis component and a Y-axis component. Thus, the flight vehicle 700 can be moved in a desired direction in the XY plane. As such, the flight vehicle 700 can be horizontally moved with the suspender 703 held in a fixed orientation, and the orientation of the cargo W can be stabilized during transportation of the cargo W. Additionally, reduction in responsivity which may occur when the cargo W is a heavy object can be prevented. Further, since the cargo W is suspended by the suspension cables 702 extending from different locations on the suspender 703, shaking of the cargo W can be effectively reduced during transportation.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

The invention claimed is:

1. A flight vehicle, comprising:
a main body;
a thrust generating unit comprising one or more thrust generating subunits; and
one or more joints, each joint respectively associated with a corresponding thrust generating subunit of the one or more thrust generating subunits, wherein each joint couples the corresponding thrust generating subunit to the main body and permits the corresponding thrust generating subunit to freely pivot relative to the main body along a circumference of a circle centered on a first pivot axis intersecting a direction of thrust generated by the corresponding thrust generating subunit, wherein
each thrust generating subunit comprises a plurality of thrust generators, each thrust generator being configured to change a magnitude of thrust to be generated independently of the other thrust generators, and
within each thrust generating subunit, a first thrust generator group constituted by one or more of the thrust generators is arranged to generate thrust that induces a first torque urging the thrust generating subunit in one direction along the circumference of the circle centered on the first pivot axis, and a second thrust generator group constituted by other one or more of the thrust generators is arranged to generate thrust that induces a second torque urging the thrust generating subunit in an opposite direction along the circumference of the circle centered on the first pivot axis.

2. The flight vehicle according to claim 1, further comprising:
control circuitry configured to control operation of each thrust generator, wherein
the control circuitry adjusts the magnitude of the thrust generated by each thrust generator of the first thrust generator group and the magnitude of the thrust generated by each thrust generator of the second thrust generator group to balance the first torque urging the thrust generating subunit in the one direction along the circumference of the circle centered on the first pivot axis and the second torque urging the thrust generating subunit in the opposite direction along the circumference of the circle centered on the first pivot axis.

3. The flight vehicle according to claim 2, wherein the control circuitry adjusts the magnitude of the thrust generated by each thrust generator of the first thrust generator group and the magnitude of the thrust generated by each thrust generator of the second thrust generator group to break the balance between the first torque urging the thrust generating subunit in the one direction along the circumference of the circle centered on the first pivot axis and the second torque urging the thrust generating subunit in the opposite direction along the circumference of the circle centered on the first pivot axis.

4. The flight vehicle according to claim 1, further comprising:
control circuitry configured to control operation of each thrust generator; and
an inclination angle detector configured to detect information for detecting an angular position of the joint along the circumference of the circle centered on the first pivot axis, wherein
in a case that there is no deviation between an input target angular position of the joint along the circumference of the circle centered on the first pivot axis and the angular position of the joint as detected by the inclination angle detector along the circumference of the circle centered on the first pivot axis, the control circuitry adjusts the magnitude of the thrust generated by each thrust generator of the first thrust generator group and the magnitude of the thrust generated by each thrust generator of the second thrust generator group to balance the first torque urging the thrust generating subunit in the one direction along the circumference of the circle centered on the first pivot axis and the second torque urging the thrust generating subunit in the opposite direction along the circumference of the circle centered on the first pivot axis, and
in a case that there is a deviation between the input target angular position of the joint along the circumference of the circle centered on the first pivot axis and the angular position of the joint as detected by the inclination angle detector along the circumference of the circle centered on the first pivot axis, the control circuitry adjusts the magnitude of the thrust generated by each thrust generator of the first thrust generator group and the magnitude of the thrust generated by each thrust generator of the second thrust generator group to break the balance between the first torque urging the thrust generating subunit in the one direction along the circumference of the circle centered on the first pivot axis and the second torque urging the thrust generating subunit in the opposite direction along the circumference of the circle centered on the first pivot axis and reduce the deviation.

5. The flight vehicle according to claim 1, wherein
the one or more thrust generating subunits include first, second, third, and fourth thrust generating subunits,
the first, second, third, and fourth thrust generating subunits are arranged in this order at regular intervals along a circumference of a circle centered on a yaw axis of the flight vehicle,
the first pivot axes of the joints associated with the first and third thrust generating subunits extend in a forward/rearward direction, and
the first pivot axes of the joints associated with the second and fourth thrust generating subunits extend in a leftward/rightward direction.

6. The flight vehicle according to claim 1, wherein
each joint coupling the associated thrust generating subunit to the main body further permits the associated thrust generating subunit to freely pivot relative to the main body along a circumference of a circle centered on a second pivot axis intersecting the direction of the thrust generated by the associated thrust generating subunit and intersecting the first pivot axis,
the thrust generators of each thrust generating subunit include three or more thrust generators, and
in each thrust generating subunit, a third thrust generator group constituted by one or more of the three or more thrust generators is arranged to generate thrust that induces a third torque urging the thrust generating subunit in one direction along the circumference of the circle centered on the second pivot axis, and a fourth thrust generator group constituted by other one or more of the three or more thrust generators is arranged to generate thrust that induces a fourth torque urging the thrust generating subunit in an opposite direction along the circumference of the circle centered on the second pivot axis.

7. The flight vehicle according to claim 6, further comprising:
control circuitry configured to control operation of each thrust generator, wherein
the control circuitry adjusts the magnitude of the thrust generated by each thrust generator of the first thrust generator group and the magnitude of the thrust generated by each thrust generator of the second thrust generator group to balance the first torque urging the thrust generating subunit in the one direction along the circumference of the circle centered on the first pivot axis and the second torque urging the thrust generating subunit in the opposite direction along the circumference of the circle centered on the first pivot axis, and
the control circuitry adjusts the magnitude of the thrust generated by each thrust generator of the third thrust generator group and the magnitude of the thrust generated by each thrust generator of the fourth thrust generator group to balance the third torque urging the thrust generating subunit in the one direction along the circumference of the circle centered on the second pivot axis and the fourth torque urging the thrust generating subunit in the opposite direction along the circumference of the circle centered on the second pivot axis.

8. The flight vehicle according to claim 7, wherein
the control circuitry adjusts the magnitude of the thrust generated by each thrust generator of the first thrust generator group and the magnitude of the thrust generated by each thrust generator of the second thrust generator group to break the balance between the first torque urging the thrust generating subunit in the one direction along the circumference of the circle centered on the first pivot axis and the second torque urging the thrust generating subunit in the opposite direction along the circumference of the circle centered on the first pivot axis, and
the control circuitry adjusts the magnitude of the thrust generated by each thrust generator of the third thrust generator group and the magnitude of the thrust generated by each thrust generator of the fourth thrust generator group to break the balance between the third torque urging the thrust generating subunit in the one direction along the circumference of the circle centered on the second pivot axis and the fourth torque urging the thrust generating subunit in the opposite direction along the circumference of the circle centered on the second pivot axis.

9. The flight vehicle according to claim 6, further comprising:
control circuitry configured to control operation of each thrust generator; and
an inclination angle detector configured to detect information for detecting an angular position of the joint along the circumference of the circle centered on the first pivot axis and an angular position of the joint along the circumference of the circle centered on the second pivot axis, wherein
in a case that there is no deviation between an input target angular position of the joint along the circumference of the circle centered on the first pivot axis and the angular position of the joint as detected by the inclination angle detector along the circumference of the circle centered on the first pivot axis, the control circuitry adjusts the magnitude of the thrust generated by each thrust generator of the first thrust generator group and the magnitude of the thrust generated by each thrust generator of the second thrust generator group to balance the first torque urging the thrust generating subunit in the one direction along the circumference of the circle centered on the first pivot axis and the second torque urging the thrust generating subunit in the opposite direction along the circumference of the circle centered on the first pivot axis,
in a case that there is a deviation between the input target angular position of the joint along the circumference of the circle centered on the first pivot axis and the angular position of the joint as detected by the inclination angle detector along the circumference of the circle centered on the first pivot axis, the control circuitry adjusts the magnitude of the thrust generated by each thrust generator of the first thrust generator group and the magnitude of the thrust generated by each thrust generator of the second thrust generator group to break the balance between the first torque urging the thrust generating subunit in the one direction along the circumference of the circle centered on the first pivot axis and the second torque urging the thrust generating subunit in the opposite direction along the circumference of the circle centered on the first pivot axis and reduce the deviation,
in a case that there is no deviation between an input target angular position of the joint along the circumference of the circle centered on the second pivot axis and the angular position of the joint as detected by the inclination angle detector along the circumference of the circle centered on the second pivot axis, the control circuitry adjusts the magnitude of the thrust generated by each thrust generator of the third thrust generator group and the magnitude of the thrust generated by each thrust generator of the fourth thrust generator group to balance the third torque urging the thrust generating subunit in the one direction along the circumference of the circle centered on the second pivot axis and the fourth torque urging the thrust generating subunit in the opposite direction along the circumference of the circle centered on the second pivot axis, and
in a case that there is a deviation between the input target angular position of the joint along the circumference of the circle centered on the second pivot axis and the angular position of the joint as detected by the inclination angle detector along the circumference of the circle centered on the second pivot axis, the control circuitry adjusts the magnitude of the thrust generated by each thrust generator of the third thrust generator group and the magnitude of the thrust generated by each thrust generator of the fourth thrust generator group to break the balance between the third torque urging the thrust generating subunit in the one direction along the circumference of the circle centered on the second pivot axis and the fourth torque urging the thrust generating subunit in the opposite direction along the circumference of the circle centered on the second pivot axis and reduce the deviation.

10. The flight vehicle according to claim 6, wherein
the one or more thrust generating subunits include first, second, third, and fourth thrust generating subunits, and
the first, second, third, and fourth thrust generating subunits are arranged in this order at regular intervals along a circumference of a circle centered on a yaw axis of the flight vehicle.

11. A flight vehicle, comprising:
a main body;
a thrust generating device comprising one or more thrust generating sub-devices, each thrust generating sub-device comprising a plurality of thrust generators arranged in a line and a coupler coupling the plurality of thrust generators together, and each thrust generator being configured to change a magnitude of thrust to be generated independently of other thrust generators in the respective thrust generating sub-device; and
one or more joints, each joint respectively associated with a corresponding thrust generating sub-device of the one or more thrust generating sub-devices, wherein each joint couples the coupler of the corresponding thrust generating sub-device to the main body and permits the coupler to freely pivot relative to the main body along a circumference of a circle centered on a first pivot axis intersecting a direction in which the thrust generators, of the corresponding thrust generating sub-device, are arranged and intersecting a direction of thrust generated by the corresponding thrust generating sub-device.

12. The flight vehicle according to claim 1, further comprising:
a pair of left and right fixed wings, each fixed wing having a proximal end secured to the main body, the left fixed wing extending leftward from the main body, the right fixed wing extending rightward from the main body, and the left and right fixed wings being configured to generate lift upon forward movement of the main body, wherein
the one or more thrust generating subunits include a left thrust generating subunit coupled to the left fixed wing and a right thrust generating subunit coupled to the right fixed wing, and
the first pivot axes of the left and right thrust generating subunits extend in a leftward/rightward direction.

13. The flight vehicle according to claim 11, further comprising:
a pair of left and right fixed wings, each fixed wing having a proximal end secured to the main body, the left fixed wing extending leftward from the main body, the right fixed wing extending rightward from the main body, and the left and right fixed wings being configured to generate lift upon forward movement of the main body, wherein
the one or more thrust generating sub-devices include a left thrust generating sub-device coupled to the left fixed wing and a right thrust generating sub-device coupled to the right fixed wing, and
the first pivot axes of the left and right thrust generating sub-devices extend in a leftward/rightward direction.

14. The flight vehicle according to claim 1, further comprising:
a pair of left and right fixed wings, each fixed wing having a proximal end coupled to the main body, the left fixed wing extending leftward from the main body, the right fixed wing extending rightward from the main body, each of the left and right fixed wings being swingable between a first angular position and a second angular position along a circumference of a circle centered on a fixed wing pivot axis parallel to the first pivot axis, the first angular position being a position where a chord of the fixed wing extends in an upward/downward direction, the second angular position being a position where the chord extends in a horizontal direction, and each of the left and right fixed wings being configured to, when placed in the second angular position, generate lift upon forward movement of the main body, and
the one or more thrust generating subunits include a left thrust generating subunit coupled to the left fixed wing and a right thrust generating subunit coupled to the right fixed wing.

15. The flight vehicle according to claim 14, wherein
each of the fixed wings is freely swingable between the first angular position and the second angular position, the flight vehicle further comprises:
a joint locking mechanism configured to prevent and permit movement of each of the joints associated with the left and right thrust generating subunits along the circumference of the circle centered on the first pivot axis; and
a fixed wing locking mechanism configured to prevent and permit swinging movement of each of the fixed wings along the circumference of the circle centered on the fixed wing pivot axis, and
in each of the left and right thrust generating subunits, a first thrust generator group constituted by one or more of the thrust generators is arranged to generate thrust that induces a third torque urging the thrust generating subunit in one direction along the circumferences of the circles centered on the first pivot axis and the fixed wing pivot axis, and a second thrust generator group constituted by other one or more of the thrust generators is arranged to generate thrust that induces a fourth torque urging the thrust generating subunit in an opposite direction along the circumferences of the circles centered on the first pivot axis and the fixed wing pivot axis.

16. The flight vehicle according to claim 1, wherein
the thrust generating unit comprises a plurality of the thrust generating subunits, the plurality of thrust generating subunits includes the one or more thrust generating subunits,
the main body comprises a suspension cable and a suspender configured to suspend a cargo via the suspension cable,
the suspension cable hangs from the suspender, and
each joint couples the corresponding thrust generating subunit to the suspender.

17. The flight vehicle according to claim 16, wherein
the main body comprises a plurality of the suspension cables, the plurality of suspension cables includes the suspension cable, and
each suspension cable, of the plurality of suspension cables, hangs from a different location on the suspender.

18. The flight vehicle according to claim 1, further comprising:
a brake configured to prevent and permit movement of a joint of the one or more joints.

19. The flight vehicle according to claim 1, further comprising:
a damper configured to apply a damping force to pivoting movement of a joint of the one or more joints.

20. A method of controlling a flight vehicle that includes a main body, a thrust generating unit including one or more thrust generating subunits, a first detector, and one or more joints, wherein
each joint is respectively associated with a corresponding thrust generating subunit of the one or more thrust generating subunits, each joint couples the corresponding thrust generating subunit to the main body and permits the corresponding thrust generating subunit to freely pivot relative to the main body along a circumference of a circle centered on a first pivot axis intersecting a direction of thrust generated by the corresponding thrust generating subunit, the first detector is configured to detect an angular position of a joint along the circumference of the circle centered on the first pivot axis, each thrust generating subunit includes a plurality of thrust generators, each thrust generator being configured to change a magnitude of thrust to be generated independently of the other thrust generators, and in each thrust generating subunit, a first thrust generator group constituted by one or more of the thrust generators is arranged to generate thrust that induces a first torque urging the thrust generating subunit in one direction along the circumference of the circle centered on the first pivot axis, and a second thrust generator group constituted by other one or more of the thrust generators is arranged to generate thrust that induces a second torque urging the thrust generating subunit in an opposite direction along the circumference of the circle centered on the first pivot axis, the method comprising:

adjusting, in a case that there is no deviation between an input target angular position of the joint along the circumference of the circle centered on the first pivot axis and the angular position of the joint as detected by the first detector along the circumference of the circle centered on the first pivot axis, the magnitude of the thrust generated by each thrust generator of the first thrust generator group and the magnitude of the thrust generated by each thrust generator of the second thrust generator group to balance the first torque urging the thrust generating subunit in the one direction along the circumference of the circle centered on the first pivot axis and the second torque urging the thrust generating subunit in the opposite direction along the circumference of the circle centered on the first pivot axis; and adjusting, in a case that there is a deviation between the input target angular position of the joint along the circumference of the circle centered on the first pivot axis and the angular position of the joint as detected by the inclination angle detector along the circumference of the circle centered on the first pivot axis, the magnitude of the thrust generated by each thrust generator of the first thrust generator group and the magnitude of the thrust generated by each thrust generator of the second thrust generator group to break the balance between the first torque urging the thrust generating subunit in the one direction along the circumference of the circle centered on the first pivot axis and the second torque urging the thrust generating subunit in the opposite direction along the circumference of the circle centered on the first pivot axis and reduce the deviation.

* * * * *